US012695012B2

(12) United States Patent
Kanada et al.

(10) Patent No.: US 12,695,012 B2
(45) Date of Patent: Jul. 28, 2026

(54) METAL MAGNETIC POWDER, COMPOSITE MAGNETIC BODY, AND ELECTRONIC COMPONENT

(71) Applicant: TDK CORPORATION, Tokyo (JP)

(72) Inventors: Isao Kanada, Tokyo (JP); Hiroshi Ito, Tokyo (JP); Kyohei Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 356 days.

(21) Appl. No.: 18/455,860

(22) Filed: Aug. 25, 2023

(65) Prior Publication Data

US 2024/0071659 A1 Feb. 29, 2024

(30) Foreign Application Priority Data

Aug. 26, 2022 (JP) ................................ 2022-135203

(51) Int. Cl.

| | |
|---|---|
| ***H01F 1/147*** | (2006.01) |
| ***B22F 1/054*** | (2022.01) |
| ***B22F 1/10*** | (2022.01) |
| ***B22F 3/02*** | (2006.01) |
| ***C22C 19/07*** | (2006.01) |
| ***H01F 1/00*** | (2006.01) |
| *B22F 1/145* | (2022.01) |

(52) U.S. Cl.

CPC .......... *H01F 1/14733* (2013.01); *B22F 1/054* (2022.01); *B22F 1/10* (2022.01); *B22F 3/02* (2013.01); *C22C 19/07* (2013.01); *H01F 1/0054* (2013.01); *B22F 1/147* (2022.01); *B22F 2202/01* (2013.01); *B22F 2301/15* (2013.01); *B22F 2304/054* (2013.01); *B22F 2998/10* (2013.01); *B22F 2999/00* (2013.01); *C22C 2202/02* (2013.01)

(58) Field of Classification Search

CPC .... B22F 1/054; B22F 1/10; B22F 3/02; H01F 1/14733; H01F 1/0054

See application file for complete search history.

(56) References Cited

U.S. PATENT DOCUMENTS

| | | | | |
|---|---|---|---|---|
| 6,262,129 | B1 * | 7/2001 | Murray | C22B 23/04 252/62.55 |
| 2013/0228716 | A1 * | 9/2013 | Suetsuna | H01F 1/24 427/127 |
| 2023/0339018 | A1 * | 10/2023 | Takahashi | H01F 1/26 |
| 2023/0343497 | A1 * | 10/2023 | Takahashi | H01F 1/26 |
| 2024/0071662 | A1 * | 2/2024 | Takahashi | C22C 19/007 |

FOREIGN PATENT DOCUMENTS

JP 2006-303298 A 11/2006

OTHER PUBLICATIONS

CN 102969105 A. Machine translation and original document. (Year: 2013).*

* cited by examiner

*Primary Examiner* — Tima M. McGuthry-Banks
(74) *Attorney, Agent, or Firm* — Oliff PLC

(57) ABSTRACT

A metal magnetic powder includes: metal nanoparticles having an average particle size (D50) is 1 nm to 100 nm, and a main phase of hcp-Co; and an additive elements α including at least one of Fe, Ni, and Cu.

7 Claims, 4 Drawing Sheets

[FIG. 1]
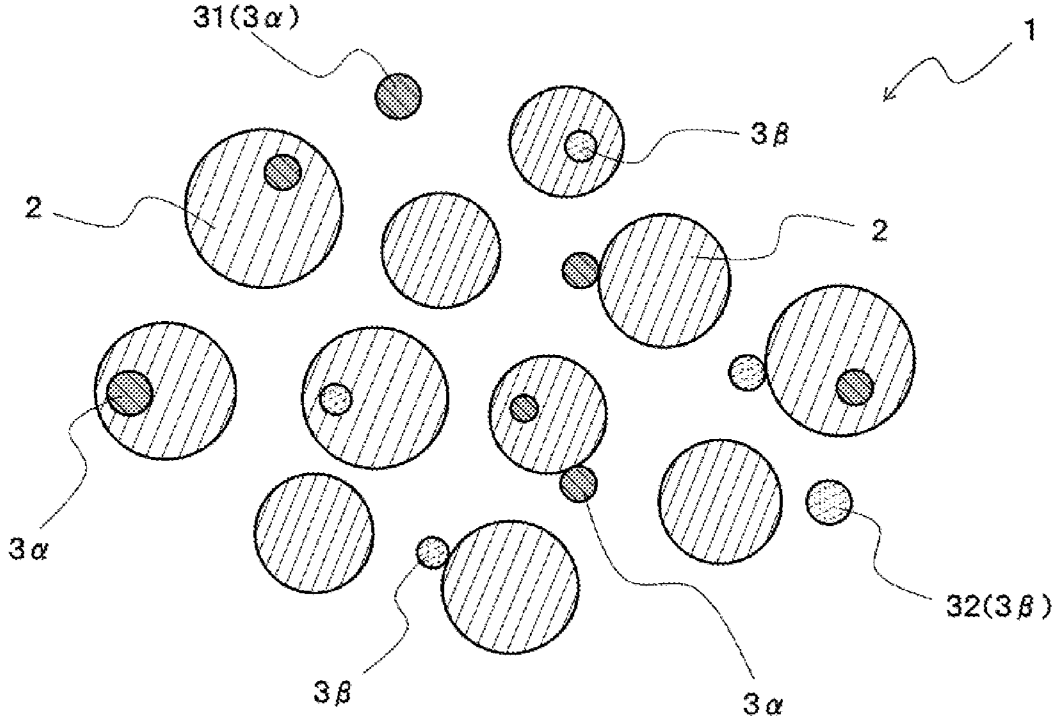

[FIG. 2]
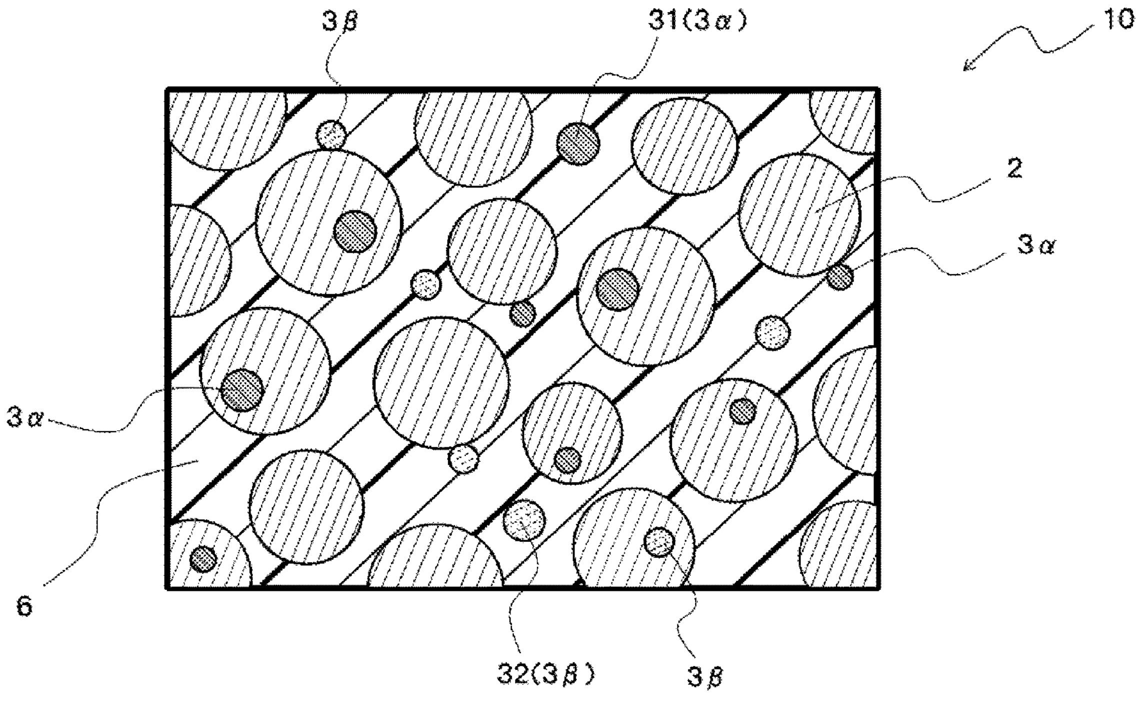

[FIG. 3]
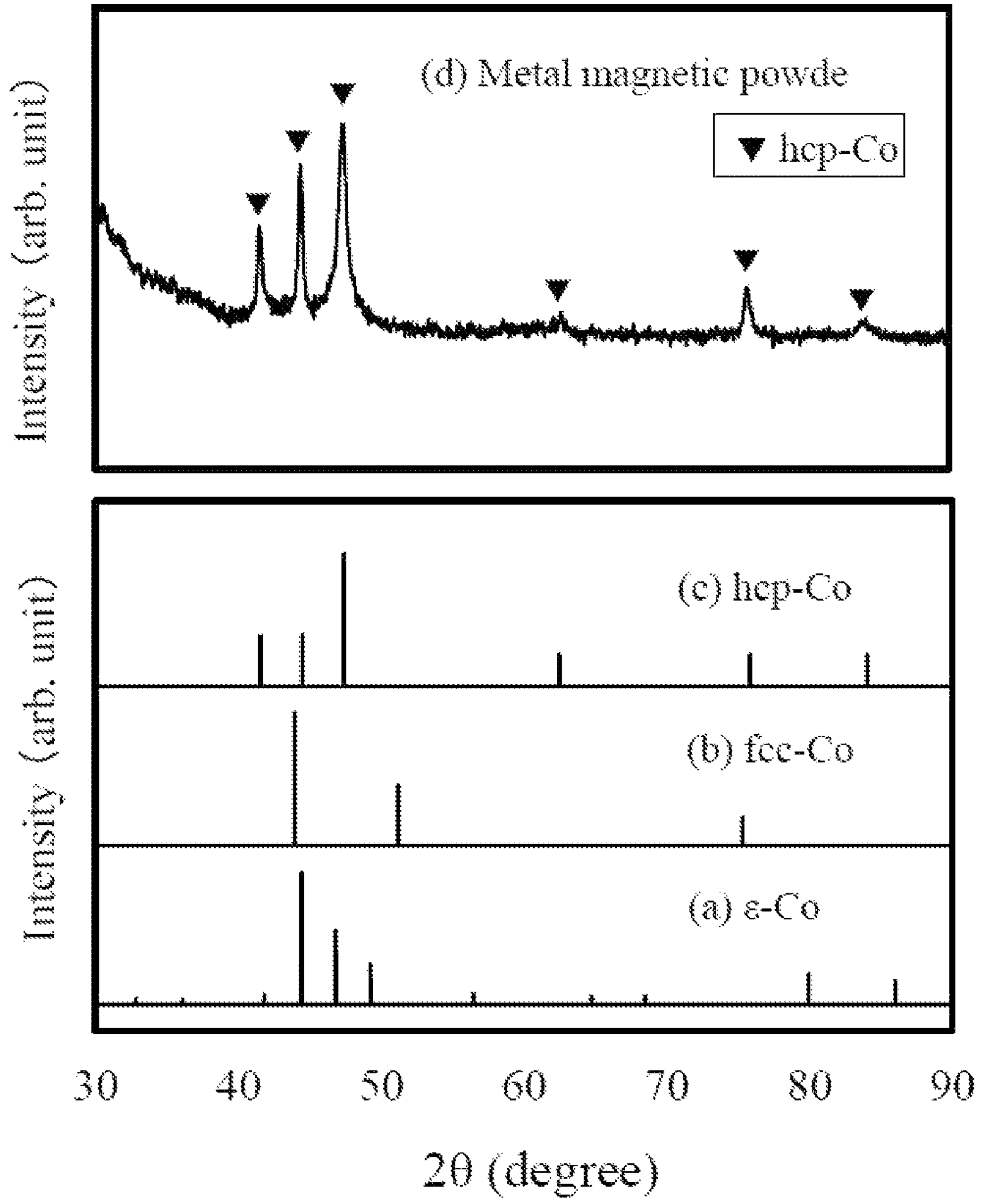

[FIG. 4]
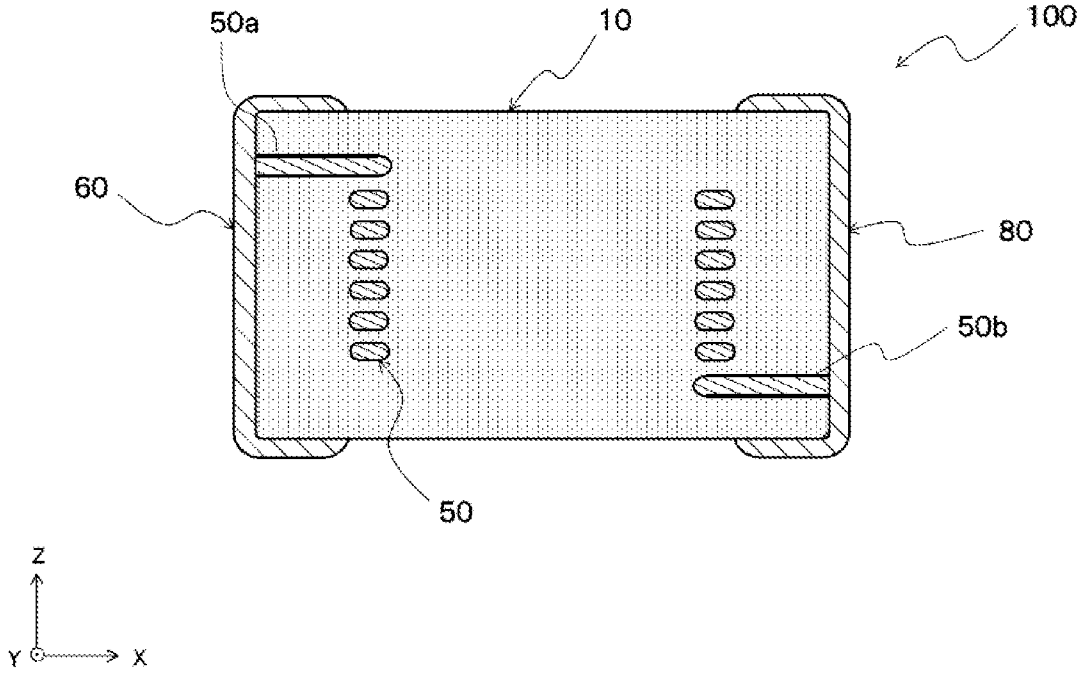

METAL MAGNETIC POWDER, COMPOSITE MAGNETIC BODY, AND ELECTRONIC COMPONENT

BACKGROUND OF THE INVENTION

1. Field of the Invention

The present disclosure relates to a metal magnetic powder including metal nanoparticles including Co as a main component, a composite magnetic body, and an electronic component.

2. Description of the Related Art

In recent years, in a high-frequency circuit included in various communication devices such as a mobile phone and a wireless LAN device, an operation frequency reaches a gigahertz band (for example, 3.7 GHz band (3.6 to 4.2 GHz), 4.5 GHz band (4.4 to 4.9 GHz band)). Examples of an electronic component mounted at the high-frequency circuit include an inductor, an antenna, and a filter for high-frequency noise countermeasure. As a coil that is embedded in the electronic component for high frequencies, a coreless coil including a non-magnetic magnetic core is typically used, but there is a demand for development of a magnetic material applicable to the electronic component for high frequencies in order to improve characteristics of the electronic components.

For example, JP 2006-303298 A discloses a magnetic material consisting of metal nanoparticles as the magnetic material for high frequencies. The metal nanoparticles are capable of decreasing the number of magnetic domains per unit particle and reducing an eddy current loss at a high-frequency band in comparison to micrometer-order metal magnetic particles. However, even in the magnetic material disclosed in JP 2006-303298 A, when an operation frequency exceeds 1 GHz, magnetic permeability extremely decreases (refer to FIG. 2 of JP 2006-303298 A), and a magnetic loss increases.

CITATION LIST

Patent Document

Patent Document 1: JP 2006-303298 A

SUMMARY OF THE INVENTION

The present disclosure has been made in consideration of such circumstances, and an object thereof is to provide a metal magnetic powder in which magnetic permeability is high and a magnetic loss is low at a high-frequency band of a gigahertz band, and a composite magnetic body and an electronic component which include the metal magnetic powder.

To accomplish the object, according to an aspect of the present disclosure, there is provided a metal magnetic powder, including: metal nanoparticles having an average particle size (D50) is 1 nm to 100 nm, and a main phase of hcp-Co; and an additive element α including at least one of Fe, Ni, and Cu.

When the metal magnetic powder has the above-described characteristics, at a high-frequency band that is a gigahertz band, high magnetic permeability and a low magnetic loss can be obtained in a compatible manner.

Preferably, a weight ratio of the total content of the additive element α to the content of Co is 10 ppm to 2000 ppm.

Preferably, the metal magnetic powder further includes an additive element β including at least one of Na, Mg, and Ca.

Preferably, a weight ratio of the total content of the additive element β to the content of Co is 10 ppm to 1500 ppm.

According to an aspect of the present disclosure, there is provided a composite magnetic body including: metal nanoparticles having an average particle size (D50) is 1 nm to 100 nm, and a main phase of hcp-Co; a resin; and an additive element α including at least one of Fe, Ni, and Cu.

When the composite magnetic body has the above-described characteristics, at a high-frequency band that is gigahertz band, high magnetic permeability and a low magnetic loss can be obtained in a compatible manner.

Preferably, the composite magnetic body further includes an additive element β including at least one of Na, Mg, and Ca.

The above-described metal magnetic powder and the composite magnetic body can be preferably used in an electronic component such as an inductor, an antenna, and a filter which are mounted at a high-frequency circuit.

BRIEF DESCRIPTION OF THE DRAWINGS

FIG. 1 is a schematic view illustrating a metal magnetic powder 1 according to an embodiment of the present disclosure;

FIG. 2 is a schematic view illustrating a cross-section of a composite magnetic body including the metal magnetic powder 1 illustrated in FIG. 1;

FIG. 3 is an example of an X-ray diffraction chart of the metal magnetic powder 1; and FIG. 4 is a schematic cross-sectional view illustrating an example of an electronic component including the composite magnetic body 10 illustrated in FIG. 2.

DETAILED DESCRIPTION OF THE PREFERRED EMBODIMENTS

Hereinafter, the present disclosure will be described in detail with reference to an embodiment illustrated in the accompanying drawings.

(Metal Magnetic Powder 1)

A metal magnetic powder 1 according to this embodiment includes nanoparticles 2, and an average particle size of the nanoparticles 2 (that is, an average particle size of the metal magnetic powder 1) is 1 nm to 100 nm. The average particle size of the nanoparticles 2 can be calculated by measuring an equivalent circle diameter of each of the nanoparticles 2 by using a transmission electron microscope (TEM). Specifically, the metal magnetic powder 1 is observed by the TEM at a magnification of 500000 or more times, an area of the nanoparticle 2 included in an observation field of view is measured by image analysis software, and the equivalent circle diameter of the nanoparticle is calculated from the measurement results. At this time, it is preferable to measure the equivalent circle diameter of at least 500 or more nanoparticles 2, and a number-basis accumulative frequency distribution is obtained on the basis of the measurement results. Then, in the accumulative frequency distribution, an equivalent circle diameter in which the accumulative frequency is 50% may be calculated as the average particle size (D50) of the nanoparticles 2.

Note that, the average particle size (D50) of the nanoparticles 2 is preferably 70 nm or less, and more preferably 50 nm or less. As the average particle size of the nanoparticles 2 is set to be smaller, a magnetic loss tan $\delta$ of the metal magnetic powder 1 tends to further decrease. The shape of the nanoparticles 2 is not particularly limited, but in a production method shown in this embodiment, typically, nanoparticles 2 having a spherical shape or a nearly spherical shape are obtained, and average circularity of the nanoparticles 2 is preferably 0.8 or more. When an area of a projection figure of each of the nanoparticles 2 is set as S, and a peripheral length of the projection figure of the nanoparticles 2 is set as L, the circularity of each of the nanoparticles 2 is expressed as $2(\pi S)^{1/2}/L$. In addition, a coating such as an oxide coating or an insulation coating may be formed on surfaces of the nanoparticles 2.

The metal magnetic powder 1 includes cobalt (Co) as a main component. That is, the nanoparticles 2 are metal nanoparticles including Co as a main component. Note that, the "main component" represents an element occupying 80 wt % or more in the metal magnetic powder 1. The metal magnetic powder 1 preferably includes 90 wt % or more of Co, and more preferably 93 wt % or more.

In addition, the metal magnetic powder 1 includes an additive element $\alpha$ including at least one of iron (Fe), nickel (Ni), and copper (Cu) in addition to Co (main component). Here, description of "including an additive element $\alpha$" represents that a weight ratio of the content of the additive element $\alpha$ to the content of Co in the metal magnetic powder 1 is 1 ppm or more. For example, when the weight ratio (Fe/Co) of the content of Fe to the content of Co is 1 ppm or more, it is determined that the metal magnetic powder 1 includes Fe, and when Fe/Co is less than 1 ppm, it is determined that the metal magnetic powder 1 does not include Fe. The presence or absence of Ni and Cu may be determined in a similar manner as in Fe.

Note that, the additive element $\alpha$ included in the metal magnetic powder 1 may be any one kind among Fe, Ni, and Cu, or may be two kinds or three kinds selected from Fe, Ni, and Cu. There is a possibility that the additive element $\alpha$ may exist at the inside of the nanoparticles 2 and on surfaces of the nanoparticles 2 and at the outside of the nanoparticles 2. "Outside of the nanoparticles 2" represents that the additive element $\alpha$ exists separately from the nanoparticles 2. The additive element $\alpha$ preferably exists mainly at the "inside of the nanoparticles 2".

The content of Co in the metal magnetic powder 1 is set as $W_{Co}$ (wt %), and the total content of the additive element $\alpha$ (that is, the total content of Fe, Ni, and Cu) in the metal magnetic powder 1 is set as $W_\alpha$ (wt %). In the metal magnetic powder 1 in this embodiment, a weight ratio $W_\alpha/W_{Co}$ of $W_\alpha$ to $W_{Co}$ (that is, (Fe+Ni+Cu)/Co) is preferably 10 ppm to 2000 ppm. In addition, $W_\alpha/W_{Co}$(lower limit) is more preferably 70 ppm or more, and still more preferably 100 ppm or more. $W_\alpha/W_{Co}$(upper limit) is more preferably 1000 ppm or less, and still more preferably 700 ppm or less.

Note that, in a case where the metal magnetic powder 1 includes two or more kinds of additive elements $\alpha$, $W_\alpha/W_{Co}$ can be expressed by the sum of Fe/Co, Ni/Co, and Cu/Co, and a distribution of Fe/Co, Ni/Co, and Cu/Co is not particularly limited.

The metal magnetic powder 1 preferably further includes an additive element $\beta$ including at least one of Na, Mg, and Ca. Here, description of "including an additive element 3" represents that a weight ratio of the content of the additive element $\beta$ to the content of Co in the metal magnetic powder 1 is equal to or more than a defined value. Specifically, with regard to Na, when Na/Co is 1 ppm or more, it is determined that the metal magnetic powder 1 includes Na, and when Na/Co is less than 1 ppm, it is determined that metal magnetic powder 1 does not include Na. With regard to Mg, similarly, when Mg/Co is 1 ppm or more, it is determined that the metal magnetic powder 1 includes Mg, and when Mg/Co is less than 1 ppm, it is determined that the metal magnetic powder 1 does not include Mg. With regard to Ca, when Ca/Co is 5 ppm or more, it is determined that the metal magnetic powder 1 includes Ca, and when Ca/Co is less than 5 ppm, it is determined that the metal magnetic powder 1 does not include Ca.

The additive element $\beta$ included in the metal magnetic powder 1 may be any one kind among Na, Mg, and Ca, or may be two kinds or three kinds selected from Na, Mg, and Ca. There is a possibility that the additive element $\beta$ may exist at the inside of the nanoparticles 2, on the surfaces of the nanoparticles 2, and at the outside of the nanoparticles 2. "Outside of the nanoparticles 2" represents that the additive element $\beta$ exists separately from the nanoparticles 2. The additive element $\beta$ preferably exists mainly on the "surfaces of the nanoparticles 2" and at the "outside of the nanoparticles 2".

The total content of the additive element $\beta$ (that is, the total content of Na, Mg, and Ca) in the metal magnetic powder 1 is set as $W_\beta$ (wt %). In the metal magnetic powder 1 of this embodiment, a weight ratio $W_\beta/W_{Co}$ of $W_\beta$ to $W_{Co}$ (that is, (Na+Mg+Ca)/Co) is preferably 10 ppm to 1500 ppm. In addition, $W_\beta/W_{Co}$ (lower limit) is more preferably 90 ppm or more, and still more preferably 300 ppm or more. $W_\beta/W_{Co}$ (upper limit) is more preferably 1000 ppm or less, and still more preferably 900 ppm or less.

Note that, in a case where the metal magnetic powder 1 includes two or more kinds of additive elements $\beta$, $W_\beta/W_{Co}$ can be expressed as the sum of Na/Co, Mg/Co, and Ca/Co, and a distribution of Na/Co, Mg/Co, and Ca/Co is not particularly limited.

The metal magnetic powder 1 may include other minor elements such as Cl, P, C, Si, N, and O. The total content ratio of the other minor elements in the metal magnetic powder 1 is less than 20 wt %, and preferably less than 7 wt %.

The composition ($W_{Co}$, $W_\alpha$, $W_\beta$, $W_\alpha/W_{Co}$, $W_\beta/W_{Co}$, and the like) of the metal magnetic powder 1 can be measured, for example, by composition analysis using an inductively coupled plasma atomic emission spectroscopy (ICP-AES), X-ray diffraction (XRD), X-ray fluorescence analysis (XRF), energy dispersive X-ray analysis (EDS), wavelength dispersive X-ray analysis (WDS), or the like, and the ICP-AES is preferably used in the measurement. In the composition analysis by the ICP-AES, first, a sample including the metal magnetic powder 1 is taken in a glove box, and the sample is added to an acidic solution such as nitric acid ($HNO_3$) and is dissolved through heating. Composition analysis by the ICP-AES is performed by using the sample converted into a solution, and Co, the additive element $\alpha$, and the additive element $\beta$ included in the sample may be quantified.

Note that, a main component of the metal magnetic powder 1 may be specified on the basis of X-ray diffraction analysis, or the like. For example, volume ratios of respective elements included in the metal magnetic powder 1 are calculated by X-ray diffraction analysis or the like, and an element with the highest volume may be recognized as the main component in the metal magnetic powder 1.

The metal magnetic powder 1 of this embodiment includes hcp-Co as a main phase. That is, a main phase of the nanoparticles 2 is hcp-Co. fcc-Co and/or ε-Co may be included in the metal magnetic powder 1 (nanoparticles 2) as a crystal phase of Co other than hcp-Co. Here, hcp represents a hexagonal close packing structure, and "hcp-Co" is not an alloy phase, and represents a Co crystal phase having a hexagonal close packing structure. In addition, fcc-Co represents a Co crystal phase having a face centered cubic structure, and ε-Co represents a Co crystal phase having a cubic structure different from hcp and fcc. In a case where Co is a fine particle of 100 nm or less, typically, fcc-Co and/or ε-Co are likely to be generated, but the nanoparticles 2 in this embodiment include hcp-Co as a main phase.

Here, "main phase of the nanoparticles 2 (that is, the main phase of the metal magnetic powder 1)" represents a crystal phase with a highest content ratio among hcp-Co, fcc-Co, and ε-Co. For example, in the metal magnetic powder 1, a ratio of hcp-Co is set as $W_{hcp}$, a ratio of fcc-Co is set as $W_{fcc}$, and a ratio of ε-Co is set as $W_\varepsilon$, the ratio of hcp-Co can be expressed as "$W_{hcp}/(W_{hcp}+W_{fcc}+W_\varepsilon)$". $W_{hcp}/(W_{hcp}+W_{fcc}+W_\varepsilon)$ in the metal magnetic powder 1 is 50% or more, preferably 95% or more, and more preferably 99% or more.

In a case where the metal magnetic powder 1 includes fcc-Co and/or ε-Co as a sub-phase, fcc-Co and/or ε-Co are preferably mixed in the nanoparticles 2 including hcp-Co as a main phase. That is, it is preferable that the metal magnetic powder 1 includes nanoparticles 2 having a mixed phase structure of Co (structure including a main phase and a sub-phase in a grain), rather than a mixture of single-phase nanoparticles consisting of hcp-Co and another single-phase nanoparticles consisting of fcc-Co or ε-Co. In this case, nanoparticles 2 of hcp-Co (nanoparticles 2 which do not include the sub-phase of Co) and nanoparticles 2 having the mixed-phase structure (nanoparticles 2 including the sub-phase of Co) may be mixed.

The crystal structure of the metal magnetic powder 1 (that is, the crystal structure of the nanoparticles 2) can be analyzed by X-ray diffraction (XRD). For example, (d) in FIG. 3 is an example of X-ray diffraction chart of the metal magnetic powder 1. Note that, (a) to (c) in FIG. 3 are XRD patterns recorded in a database such as a literature and ICDD, (a) is an XRD pattern of ε-Co, (b) is an XRD pattern of fcc-Co, and (c) is an XRD pattern of hcp-Co.

After obtaining the X-ray diffraction chart of the metal magnetic powder 1 as shown in (d) of FIG. 3 through measurement of 2θ/θ of XRD, profile fitting (peak separation) of the measured X-ray diffraction chart is performed by using analysis software for XRD. In addition, the separated diffraction peaks are compared with the database to identify a crystal phase included in the metal magnetic powder 1. In the X-ray diffraction chart (d) shown in FIG. 3, a diffraction peak appears at the same position as in the XRD pattern (c) shown in FIG. 3, and a diffraction peak indicated by "▼" shown in (d) of FIG. 3 is a peak derived from hcp-Co. In a case where the metal magnetic powder 1 includes fcc-Co and/or ε-Co in combination with hcp-Co, a diffraction peak appears at a position shown in (a) or (b) of FIG. 3.

A ratio of the Co crystal phase may be calculated on the basis of an integrated intensity of diffraction peaks. Specifically, after identifying diffraction peaks included in the X-ray diffraction chart by the profile fitting, the integrated intensity of the identified diffraction peaks is calculated. "$W_{hcp}/(W_{hcp}+W_{fcc}+W_\varepsilon)$" may be calculated in a state in which $W_{hcp}$ is set as an integrated intensity of diffraction peaks derived from hcp-Co, $W_{fcc}$ is set as an integrated intensity of diffraction peaks derived from fcc-Co, and $W_\varepsilon$ is set as an integrated intensity of diffraction peaks derived from s-Co.

Note that, presence or absence of the mixed phase structure in a grain of the nanoparticles 2 can be confirmed through analysis using a TEM such as a high-resolution electron microscope (HREM), electron beam backscatter diffraction (EBSD), and electron beam diffraction. For example, in a case of analyzing the crystal structure of the nanoparticles 2 by electron beam diffraction of the TEM, at least 50 nanoparticles 2 are irradiated with electron beams, and it is determined that the nanoparticles 2 have which structure between the single-phase structure and the mixed-phase structure on the basis of an electron beam diffraction pattern that is obtained at the time of the irradiation. Note that, in the analysis, it is preferable to select nanoparticles 2 isolated in a field of view and to perform irradiation with electron beams.

The additive element α, the additive element β, other impurity elements, and the like may be slightly solid-soluted in hcp-Co of the nanoparticles 2. However, the degree of deviation of a lattice constant of hcp-Co is preferably 0.5% or less. "Degree of deviation of a lattice constant" is expressed by $(|d_{STD}-d_f|)/d_{STD}$ (%), and $d_{STD}$ is a lattice constant of hcp-Co which is recorded in a database, $d_f$ is a lattice constant of hcp-Co calculated by analyzing the X-ray diffraction chart of the metal magnetic powder 1. The lattice constant may be measured by an electron beam diffraction method using a TEM.

In a case where the additive element α exists at the inside of the nanoparticles 2, the additive element α is preferably included a crystal phase 3α different from hcp-Co rather than being solid-soluted in hcp-Co (refer to FIG. 1). Examples of the crystal phase 3*a* including the additive element α include a Co—Fe alloy phase having a double hexagonal crystal structure (dhcp), a Ni crystal phase having an hcp structure, a Co—Ni alloy phase having an hcp structure, a Cu crystal phase having an hcp structure, and a Co—Cu alloy phase, and the like. It is considered that the crystal phase 3α is generated at an initial stage of synthesis of the nanoparticles 2, and plays a role of promoting generation and growth of hcp-Co as a seed crystal.

As described above, the crystal phase 3α including the additive element α preferably exists mainly at the inside of the nanoparticles 2, but may exist on the surfaces of the nanoparticles 2. In addition, particles 31 including the crystal phase 3α may exist at the outside of the nanoparticles 2. Note that, a particle size of the particles 31 including the crystal phase 3α is not particularly limited, and is preferably smaller than, for example, an average particle size (D50) of the nanoparticles 2.

In a case where the additive element β exists in the nanoparticles 2, the additive element β is preferably included in a phase 3β different from hcp-Co rather than being solid-soluted in hcp-Co. Examples of the phase 3β including the additive element β include a phase consisting of a single component, a Co compound phase including at least one of Na, Mg, and Ca, and the like without a particular limitation. It is considered that the phase 3β is generated by adding a reducing additive material (for example, a borohydride compound) including the additive element β to a reaction solution in a synthesis process of the nanoparticles 2. It is considered that the additive material including the additive element β plays a role of promoting generation of the crystal phase 3α that is a seed crystal or metallization of Co in the synthesis process of the nanoparticles 2.

As described above, it is preferable that the phase 3β including the additive element β exists mainly on the surface of the nanoparticles 2 and/or at the outside of the nanoparticles 2, but the phase 3β may exist inside the nanoparticles 2. Note that, particle sizes of the particles 32 including the phase 3β is not particularly limited, and is preferably smaller than, for example, the average particle size (D50) of the nanoparticles 2.

A peak derived from the additive element α may appear in the X-ray diffraction chart of the metal magnetic powder 1. Examples of the peak derived from the additive element α include a diffraction peak of Fe, a diffraction peak of Co—Fe alloy, a diffraction peak of Ni, a diffraction peak of Cu, a diffraction peak of a Co—Ni alloy, a diffraction peak of a Co—Cu alloy, and the like.

When analyzing the X-ray diffraction chart of the metal magnetic powder 1, in a case where the above-described diffraction peak (peak derived from the additive element α) can be separately identified as a peak different from the diffraction peak of a Co crystal phase such as hcp-Co, it can be determined that the crystal phase 3α including the additive element α other than the Co crystal phase exists. That is, an existence state of the additive element α can be specified by a high-output X-ray diffraction method or the like (or an electron beam diffraction method). Note that, an existence site of the additive element α can be specified, for example, by spot analysis, line analysis, or mapping analysis which uses TEM-EDS, and the like.

Note that, in a case where the metal magnetic powder 1 includes the additive element β, an existence site of the additive element β may be specified, for example, by spot analysis, line analysis, or mapping analysis which uses TEM-EDS, and the like as in the case of additive element α.

(Composite Magnetic Body 10)

Next, description will be given of a composite magnetic body 10 including the above-described metal magnetic powder 1 on the basis of FIG. 2.

The composite magnetic body 10 includes the metal magnetic powder 1 having the above-described characteristics and a resin 6, and the nanoparticles 2 constituting the metal magnetic powder 1 are dispersed in the resin 6. That is, the resin 6 is interposed between the nanoparticles 2, and insulates adjacent particles. The resin 6 may be a resin material having an insulation property, and a material thereof is not particularly limited. For example, as the resin 6, thermosetting resins such as an epoxy resin, a phenolic resin, and a silicone resin, or thermoplastic resins such as an acrylic resin, polyethylene, and polypropylene can be used, and the thermosetting resins are preferable.

An area ratio of the metal magnetic powder 1 on a cross-section of the composite magnetic body 10 is preferably 10% to 60%, and more preferably 10% to 40%.

The area ratio of the metal magnetic powder 1 on the cross-section of the composite magnetic body 10 can be calculated by observing the cross-section of the composite magnetic body 10 by using a scanning electron microscope (SEM) or a transmission electron microscope (TEM), and by analyzing a cross-sectional image by using image analysis software. Specifically, the cross-sectional image of the composite magnetic body 10 is binarized on the basis of contrast to distinguish metal magnetic powders and the other portion, and a ratio of an area occupied by the metal magnetic powder 1 with respect to the entirety of the image (that is, an area of an observation field of view) may be calculated. The area ratio calculated by the above-described method can be regarded as a volume ratio (vol %) of the metal magnetic powder 1 included in the composite magnetic body 10.

The ratios ($W_{hcp}$, $W_{fcc}$, $W_\varepsilon$, $W_{hcp}/(W_{hcp}+W_{fcc}+W_\varepsilon)$, and the like) of crystal phases relating to Co that is a main component of the metal magnetic powder 1 may be calculated by performing measurement of 2θ/θ of XRD by using the composite magnetic body 10 as a measurement sample, and by analyzing an X-ray diffraction chart of the composite magnetic body 10. In addition, the average particle size (D50) of the metal magnetic powder 1 may be calculated by measuring an area of the nanoparticles 2 on a cross-section of the composite magnetic body 10. The composition of the metal magnetic powder 1 included in the composite magnetic body 10 (the composition of the nanoparticles 2) can be analyzed by using ICP-AES, XRD, EDS, WDS, or the like.

There is a possibility that the additive element α may exist at the inside of the nanoparticles 2, on the surfaces of the nanoparticles 2, and at the outside of the nanoparticles 2 in the composite magnetic body 10. In addition, as illustrated in FIG. 2, it is preferable that the additive element α exists in the composite magnetic body 10 in a similar aspect as in the powder sample (metal magnetic powder 1). That is, it is preferable that the crystal phase 3α including the additive element α exists at the inside of the nanoparticles 2, and may exist on the surfaces of the nanoparticles 2, and/or at the outside of the nanoparticles 2.

Presence or absence of the additive element α in the composite magnetic body 10 can be analyzed by using EDS, WDS, or the like. For example, with respect to at least 20 nanoparticles 2 existing on the cross-section of the composite magnetic body 10, spot analysis, line analysis, or mapping analysis by TEM-EDS is performed. In a case where the additive element α is trapped inside the composite magnetic body 10 in accordance with addition of the nanoparticles 2, the additive element α is detected at the inside and/or on the surface of the nanoparticles 2. That is, in a case where the characteristic X-ray of the additive element α is detected as a peak at the inside and/or on the surface of any nanoparticle 2 among analyzed particles, it can be determined that the metal magnetic powder 1 of the composite magnetic body 10 includes the additive element α.

In a case where the metal magnetic powder 1 includes the additive element β, there is a possibility that the additive element β may exist at the inside of the nanoparticles 2, on the surface of the nanoparticles 2, and at the outside of the nanoparticles 2 in the composite magnetic body 10. In addition, as illustrated in FIG. 2, it is preferable that the additive element β exists in the composite magnetic body 10 in a similar aspect as in the powder sample (metal magnetic powder 1). That is, it is preferable that the phase 3β including the additive element β exists on the surface of the nanoparticles 2 and/or at the outside of the nanoparticles 2, and the phase 3β may exist at the inside of the nanoparticles 2. Note that, presence or absence of the additive element β in the composite magnetic body 10 may be determined by spot analysis, line analysis, and mapping analysis which use TEM-EDS, or the like in a similar manner as in the additive element α.

Ceramic particles, metal particles other than the nanoparticles 2, and the like may be included in the composite magnetic body 10. In addition, a shape and dimensions of the composite magnetic body 10 are not particularly limited, and may be appropriately determined in accordance with the application thereof.

Hereinafter, an example of methods of manufacturing the metal magnetic powder 1 and the composite magnetic body 10 will be described. However, the methods of manufacturing the metal magnetic powder 1 and the composite magnetic body 10 are not limited to the following methods.

(Method of Manufacturing Metal Magnetic Powder 1)

It is preferable that the metal magnetic powder 1 (that is, the nanoparticles 2) is manufactured by subjecting a cobalt complex as a precursor to pyrolysis in a reaction solution including a predetermined additive material.

First, as a raw material, a precursor of Co and an additive material A including the additive element α are prepared, and the raw materials are weighed so that the metal magnetic powder 1 has a desired composition. As the precursor, octacarbonyl dicobalt ($Co_2(CO)_8$), $CO_4(CO)_{12}$, chlorotris (triphenylphosphine) cobalt ($CoCl(Ph_3P)_3$), or the like is preferably used. As the additive material A including the additive element α, for example, chlorides such as $FeCl_2$, $FeCl_3$, $NiCl_2$, and $CuCl_2$ are preferable. A content ratio ($W_\alpha/W_{Co}$) of the additive element α in the metal magnetic powder 1 can be controlled by a blending ratio of the additive material A.

In addition, in a case of adding the additive element β into the metal magnetic powder 1, an additive material B including the additive element β is prepared, and the additive material B is weighed so that $W_\beta/W_{Co}$ becomes a desired value. It is preferable that the additive material B including the additive element β has a reducing operation, and it is preferable to use borohydride compounds such as $NaBH_4$, $Mg(BH_4)_2$, and $Ca(BH_4)_2$.

Next, the above-described raw materials (the precursor and the predetermined additive material (A and B)), and a solvent are put into a reaction container such as a separable flask, thereby obtaining a reaction solution. As the solvent, various organic solvents such as ethanol, tetrahydrofuran (THF), oleylamine, dimethylbenzylamine, and octadecanol (stearyl alcohol) can be used. In a case where the precursor is $CoCl(Ph_3P)_3$, octadecanol is preferably used, and in a case where the precursor is $Co_2(CO)_8$, ethanol is preferably used. Note that, a surfactant such as oleic acid and a silane coupling agent may be added to the reaction solution including the precursor.

Then, the reaction container is installed in an oil bath, and the reaction solution is stirred at a predetermined temperature for predetermined time to pyrolyze the precursor in the reaction solution. At this time, an inert gas such as Ar gas is introduced into the reaction container to set the inside of the container to an inert atmosphere. The temperature of the reaction solution (hereinafter, referred to as a reaction temperature) is preferably set to an appropriate range in correspondence with a precursor that is used, but may be set to, for example, 10° C. to 210° C. In a case of using $CoCl(Ph_3P)_3$ as the precursor, a reaction temperature is preferably set to 80° C. to 210° C., and more preferably 80° C. to 180° C. In a case of using $Co_2(CO)_8$ as the precursor, the reaction temperature is preferably set to 52° C. to 100° C., and more preferably 57° C. to 80° C. As the reaction temperature is further raised, the average particle size of the nanoparticles 2 tends to further increases.

It is preferable that time (hereinafter, referred to as reaction time) for which the pyrolysis reaction continues is appropriately adjusted in accordance with the kind of the precursor or the reaction temperature, but may be, for example, 0.01 hours to 80 hours. In a case where the reaction temperature is set to 100° C. or higher, the reaction time is preferably set to 10 hours or shorter. As the reaction time is further lengthened, the average particle size of the nanoparticles 2 tends to further increase. That is, the average particle size of the nanoparticles 2 depends on the reaction temperature and the reaction time at the time of pyrolysis.

In the above-described pyrolysis reaction, it is considered that when adding the additive material A including the additive element α to the reaction solution, the Co—Fe alloy phase having the dhcp structure, the Ni crystal phase having the hcp structure, the Cu crystal phase having the hcp structure, and the like are generated as a seed crystal at an initial stage of synthesis of the nanoparticles 2. In addition, it is considered that the seed crystal plays a role of promoting generation and growth of hcp-Co. In addition, in a case of adding the additive material B including the additive element β to the reaction solution, it is considered that generation of the seed crystal and metallization of Co are promoted due to the reducing operation of the additive material B.

After passage of desired reaction time, the reaction container is cooled down to room temperature, and the generated nanoparticles 2 are washed and recovered. When washing the nanoparticles 2, a washing solvent in which unreacted raw materials, an intermediate product, and the like are soluble is used. Specifically, as the washing solvent, for example, an organic solvent such as acetone, dichlorobenzene, and ethanol can be used. In order to suppress oxidation of the nanoparticles 2, it is preferable to perform a de-gassing treatment on the washing solvent. Alternatively, as the washing solvent, it is preferable to use an organic solvent with an ultra-dehydrated grade in which the content of moisture is suppressed to 10 ppm or less. Note that, the nanoparticles 2 after washing may be recovered through settlement by centrifugal separation, or may be recovered by using a magnetic force of a magnet. Through the above-described processes, the metal magnetic powder 1 is obtained.

Note that, a series of processes from weighing of the raw materials to washing and recovery of the nanoparticles are performed in an inert gas atmosphere such as an Ar atmosphere.

(Method of Manufacturing Composite Magnetic Body 10)

Next, an example of the method of manufacturing the composite magnetic body 10 will be described.

The composite magnetic body 10 can be manufactured by mixing the metal magnetic powder 1 manufactured by the pyrolysis method, the resin 6, and the solvent, and performing a predetermined dispersion treatment. As the dispersion treatment, it is preferable to use an ultrasonic dispersion treatment, or a dispersion treatment using media such as a bead mill (hereinafter, referred to as a media dispersion treatment). Dispersion treatment conditions are not particularly limited, and various conditions may be set so that the nanoparticles 2 are evenly dispersed in the resin 6. As the solvent that is added at the time of the dispersion treatment, for example, organic solvents such as acetone, dichlorobenzene, or ethanol can be used, and it is preferable to use a degassed organic solvent, or an organic solvent with an ultra-dehydrated grade. In addition, as the media used at the time of the media dispersion treatment, various ceramic beads can be used, and it is preferable to use beads of $ZrO_2$ with large specific gravity among the various ceramic beads. Note that, the content ratio (volume ratio) of the metal magnetic powder 1 in the composite magnetic body 10 can be controlled on the basis of blending ratios of the metal magnetic powder 1 and the resin 6.

The resultant slurry obtained in the dispersion treatment is dried in an Ar atmosphere to obtain a dried body from which the solvent is volatilized. Then, the dried body is crushed by using a mortar, a dry crusher, or the like to obtain granules including the metal magnetic powder 1 and the resin 6. Then, the granules are filled in a mold and are pressurized to obtain the composite magnetic body 10. In a case of using the thermosetting resin as the resin 6, it is preferable to perform a curing treatment after the pressurization formation.

Note that, as in the manufacturing of the metal magnetic powder 1, the series of processes for obtaining the composite magnetic body 10 are preferably performed in an inert atmosphere such as an Ar atmosphere. In addition, the method of manufacturing the composite magnetic body 10 is not limited to the pressurization formation method. For example, the slurry obtained by the dispersion treatment may be applied and dried on a PET film to obtain a sheet-shaped composite magnetic body 10.

Summary of Embodiment

The metal magnetic powder 1 of this embodiment includes the nanoparticles 2 in which the average particle size (D50) is 1 nm to 100 nm, and a main phase is hcp-Co, and an additive elements α including at least one of Fe, Ni, and Cu.

When the metal magnetic powder 1 has the above-described characteristics, not only in a megahertz band but also at a high-frequency band of 1 GHz or higher, high magnetic permeability and a low magnetic loss are compatible with each other. In addition, with regard to the composite magnetic body 10, when including the metal magnetic powder 1 having the above-described characteristics, at a high-frequency band, the high magnetic permeability and the low magnetic loss are compatible with each other. The reason why the high magnetic permeability and the low magnetic loss can be realized is not clear, but it is considered that crystallinity of the Co nanoparticles 2 is improved due to the additive element α. In addition, it is considered that a seed crystal including the additive element α is generated in the synthesis process of the nanoparticles 2, and the seed crystal promotes generation and growth of hcp-Co. As a result, the degree of crystallization of hcp-Co in the nanoparticles 2 is improved, and this results in the improvement of the magnetic permeability characteristics and the low magnetic loss characteristics at the high-frequency band.

In the metal magnetic powder 1, a weight ratio ($W_\alpha/W_{Co}$) of the total content of the additive element α to the content of Co is preferably 10 ppm to 2000 ppm. When $W_\alpha/W_{Co}$ is set to the range, the magnetic loss at the high-frequency band can be further reduced.

The metal magnetic powder 1 preferably further includes an additive elements β including at least one of Na, Mg, and Ca. When the metal magnetic powder 1 includes the additive element β, at the high-frequency band, the high magnetic permeability and the low magnetic loss are more appropriately compatible with each other. It is considered that the additive element β plays a role of promoting generation of the seed crystal and metallization of Co in the synthesis process of the nanoparticles 2, and it is considered that the degree of crystallization of hcp-Co in the nanoparticles 2 is further improved due to additive element β.

In a case where the metal magnetic powder 1 includes the additive element β, a weight ratio ($W_\beta/W_{Co}$) of the total content of the additive element β to the content of Co is preferably 10 ppm to 1500 ppm. When $W_\beta/W_{Co}$ is set to the range, the magnetic loss can be further reduced while improving the magnetic permeability.

The metal magnetic powder 1 and the composite magnetic body 10 are applicable to various electronic components such as an inductor, a transformer, a choke coil, a filter, and antenna, and are preferably applicable, particularly, to an electronic component for high-frequency circuits in which an operation frequency is 1 GHz or higher (more preferably, 1 GHz to 10 GHz).

Examples of the electronic component including the metal magnetic powder 1 (or the composite magnetic body 10) include an inductor 100 illustrated in FIG. 4. An element body of the inductor 100 is constituted by the composite magnetic body 10 of this embodiment, and a coil portion 50 is embedded inside the element body. A pair of external electrodes 60 and 80 are formed on end (edge) surfaces of the element body, and the external electrodes 60 and 80 are electrically connected to leadout portions 50*a* and 50*b* of the coil portion 50, respectively. Since the electronic component such as the inductor 100 includes the metal magnetic powder 1 (the composite magnetic body 10) of this embodiment, excellent high-frequency characteristics are provided.

Hereinbefore, the embodiment of the present disclosure has been described, but the present disclosure is not limited to the above-described embodiment, and various modifications can be made within a range not departing from the gist of the present disclosure.

EXAMPLES

Hereinafter, the present disclosure will be described in more detail with reference to specific examples. However, the present invention is not limited to the following examples.

Experiment 1

In Experiment 1, metal magnetic powders shown in Table 1 to Table 3 were manufactured by a pyrolysis method. First, a precursor of Co, an additive material A including the additive element α, and a solvent were weighed, and these raw materials were put into a separable flask as a reaction container. In any of respective samples in Experiment 1, $CoCl(Ph_3P)_3$ was used as the precursor of Co, and octadecanol was used as the solvent.

As the additive material A including the additive element α, $FeCl_2$, $NiCl_2$, and $CuCl_2$ which are chlorides were prepared. Only any one kind among the additive materials A was used in Example A1 to Example A22 shown in Table 1, two kinds of the additive materials A were used Example B1 to Example B15 shown in Table 2, and all of three kinds of the additive materials A were used in Example C1 to Example C13 shown in Table 3. In the respective examples, a blending ratio of the precursor and the additive material A was controlled so that the content ratio of the additive element α becomes values shown in Table 1 to Table 3. Note that, in Comparative Example A in Experiment 1, the metal magnetic powder was manufactured by the pyrolysis method without using the additive material A.

The reaction container into which the raw materials were put was installed in an oil bath, the raw materials were stirred while heating a reaction solution in an Ar atmosphere to pyrolyze a precursor in the reaction solution. At this time, in Experiment 1, a reaction temperature was set to 150° C. and reaction time was set to one hour.

After passage of predetermined reaction time, the reaction container was left to stand, and was cooled down to room temperature. Then, generated nanoparticles were washed with ultra-dehydrated acetone, and were recovered by a magnet. Metal magnetic powders were obtained through the above-described processes. Note that, the series of working from weighting of the raw materials to washing and recovery were performed in an Ar atmosphere.

Average Particle Size of Nanoparticles

The metal magnetic powders manufactured in respective examples and comparative examples were observed at a magnification of 500000 times by using a TEM (JEM-2100F, manufactured by JEOL Ltd.). Then, an equivalent circle diameter of 500 nanoparticles was measured by image analysis software to calculate the average particle size (D50). In Experiment 1, in any sample, D50 of the nanoparticles was also within a range of 15±3 nm.

Composition Analysis of Metal Magnetic Powder

A sample for composition analysis was taken from the metal magnetic powder in a glove box, and the content of Co included in the sample, and the content of additive element α included in the sample were measured by ICP-AES (ICPS-8100CL, manufactured by SHIMADZU CORPORATION). On the basis of the measurement results, a main component (element occupying 80 wt % or more) of the metal magnetic powder was specified, and it could be confirmed that all samples in Experiment 1 include Co as the main component. In addition, the content ratio of the additive element α (Fe/Co, Ni/Co, Cu/Co, and $W_\alpha/W_{Co}$) calculated from the measurement results are shown in Table 1 to Table 3. "-" shown in a column of the content ratio in the respective tables represents that the content ratio of a target element is less than a defined amount (1 ppm), and the element is determined as not being included in the metal magnetic powder.

Crystal Structure Analysis

An X-ray diffraction chart of the metal magnetic powder was obtained through measurement of 2θ/θ by using an XRD device (Smart Lab, manufactured by Rigaku Corporation). Then, the obtained X-ray diffraction chart was analyzed by X-ray analysis integrated software (SmartLab Studio II) to calculate ratios ($W_{hcp}$, $W_{fcc}$, and $W_\varepsilon$) of hcp-Co, fcc-Co, and ε-Co. In addition, on the basis of the calculation results of $W_{hcp}$, $W_{fcc}$, and $W_\varepsilon$, a main phase of the metal magnetic powder (nanoparticles) was specified, and a ratio ($W_{hcp}/(W_{hcp}+W_{fcc}+W_\varepsilon)$) of hcp-Co was calculated. Note that, in all samples in Experiment 1, it could be confirmed that the metal magnetic powder includes hcp-Co as the main phase. The analysis results obtained by XRD are shown in Table 1 to Table 3.

Manufacturing of Composite Magnetic Body

In the respective examples and comparative examples, composite magnetic bodies were manufactured by using the metal magnetic powder by the following method.

First, the metal magnetic powder was weighed so that the content ratio of the nanoparticles in the composite magnetic body becomes 10 vol %). Then, the weighed metal magnetic powder, a polystyrene resin, and acetone as a solvent were mixed, and the resultant mixture was subjected to an ultrasonic dispersion treatment. Ultrasonic dispersion treatment time was set to 10 minutes, and a dispersion solution obtained by the ultrasonic dispersion treatment was dried in an Ar atmosphere kept at 50° C. to obtain a dried body. Then, the dried body was crushed by a mortar, and the obtained granules were filled in a mold and were pressurized to obtain a composite magnetic body. In the respective examples and comparative examples in Experiment 1, any composite magnetic body had a toroidal shape having an outer diameter of 7 mm, an inner diameter of 3 mm, a thickness of 1 mm. Note that, respective processes of manufacturing the composite magnetic body except for a formation process were performed in an Ar atmosphere.

Analysis of Composite Magnetic Body

A thin sample for TEM observation was taken from a cross-section of the composite magnetic body. Then, the thin sample was observed with a TEM, arbitrarily 20 nanoparticles included in an observation field of view were selected, and spot analysis, line analysis, and mapping analysis by TEM-EDS were performed with respect to the selected nanoparticles (hereinafter, referred to as analysis particles). In the respective examples including the additive element α, a peak of characteristic X-ray peak related to the additive element α which corresponds to the additive material A that was used was detected at the inside and/or on the surface of any analyzed particle. That is, even in a case of analyzing the composite magnetic body, it could be confirmed that the metal magnetic powder in the composite magnetic body includes the additive element α as intended.

Note that, through analysis of the X-ray diffraction chart of the composite magnetic body, it could be confirmed that in any sample in Experiment 1, the metal magnetic powder in the composite magnetic body includes Co as a main component, and includes hcp-Co as a main phase.

Evaluation of Magnetic Characteristics of Composite Magnetic Body

A real part (that is, magnetic permeability μ' (unitless)) and an imaginary part μ" of complex magnetic permeability at 5 GHz were measured by a coaxial S parameter method using a network analyzer (HP8753D, manufactured by Agilent Technologies Japan, Ltd.). Then, a magnetic loss tan δ (unitless) at 5 GHz was calculated as μ"/μ'. The magnetic permeability μ' and the magnetic loss tan δ also vary by the content ratio of the nanoparticles in the composite magnetic body. As in the respective samples in Experiment 1, in a case where the content ratio of the nanoparticles in the composite magnetic body is 10 vol %, a sample in which the magnetic permeability μ' is 1.10 or more and the magnetic loss tan δ is less than 0.150 was determined as "satisfactory". In addition, a sample in which the magnetic loss tan δ is less than 0.100 was determined as "particularly satisfactory". Evaluation results in Experiment 1 are shown in Table 1 to Table 3.

TABLE 1

| | Analysis results of metal magnetic powder | | | | | | | | Magnetic characteristics | |
|---|---|---|---|---|---|---|---|---|---|---|
| | D50 | Ratio of Co crystal phase (%) | | | Content ratio of additive element α (ppm) | | | | μ' | tanδ |
| Sample No. | (nm) | hcp-Co | fcc-Co | ε-Co | Fe/Co | Ni/Co | Cu/Co | $W_\alpha/W_{Co}$ | at 5 GHz | at 5 GHz |
| Comparative Example A | 16 | 98.2 | 0.0 | 1.8 | — | — | — | — | 1.15 | 0.156 |
| Example A1 | 14 | 98.9 | 0.0 | 1.1 | 4 | — | — | 4 | 1.13 | 0.145 |
| Example A2 | 17 | 99.1 | 0.0 | 0.9 | 10 | — | — | 10 | 1.14 | 0.093 |
| Example A3 | 12 | 100.0 | 0.0 | 0.0 | 70 | — | — | 70 | 1.13 | 0.083 |
| Example A4 | 15 | 100.0 | 0.0 | 0.0 | 153 | — | — | 153 | 1.13 | 0.089 |
| Example A5 | 12 | 100.0 | 0.0 | 0.0 | 340 | — | — | 340 | 1.15 | 0.086 |
| Example A6 | 15 | 100.0 | 0.0 | 0.0 | 1001 | — | — | 1001 | 1.14 | 0.093 |
| Example A7 | 16 | 100.0 | 0.0 | 0.0 | 1988 | — | — | 1988 | 1.16 | 0.098 |

TABLE 1-continued

| Sample No. | D50 (nm) | Ratio of Co crystal phase (%) hcp-Co | fcc-Co | ε-Co | Content ratio of additive element α (ppm) Fe/Co | Ni/Co | Cu/Co | $W_\alpha/W_{Co}$ | Magnetic characteristics μ' at 5 GHz | tanδ at 5 GHz |
|---|---|---|---|---|---|---|---|---|---|---|
| Example A8 | 17 | 100.0 | 0.0 | 0.0 | 2302 | — | — | 2302 | 1.17 | 0.140 |
| Example A9 | 16 | 99.0 | 0.0 | 1.0 | — | 3 | — | 3 | 1.14 | 0.104 |
| Example A10 | 18 | 99.3 | 0.0 | 0.7 | — | 11 | — | 11 | 1.14 | 0.085 |
| Example A11 | 15 | 99.8 | 0.0 | 0.2 | — | 98 | — | 98 | 1.15 | 0.084 |
| Example A12 | 17 | 100.0 | 0.0 | 0.0 | — | 152 | — | 152 | 1.15 | 0.086 |
| Example A13 | 13 | 100.0 | 0.0 | 0.0 | — | 342 | — | 342 | 1.14 | 0.087 |
| Example A14 | 15 | 100.0 | 0.0 | 0.0 | — | 1993 | — | 1993 | 1.15 | 0.098 |
| Example A15 | 16 | 100.0 | 0.0 | 0.0 | — | 2350 | — | 2350 | 1.15 | 0.125 |
| Example A16 | 17 | 98.3 | 0.0 | 1.7 | — | — | 5 | 5 | 1.15 | 0.103 |
| Example A17 | 18 | 99.2 | 0.0 | 0.8 | — | — | 10 | 10 | 1.14 | 0.089 |
| Example A18 | 16 | 99.7 | 0.0 | 0.3 | — | — | 101 | 101 | 1.13 | 0.084 |
| Example A19 | 14 | 100.0 | 0.0 | 0.0 | — | — | 155 | 155 | 1.15 | 0.086 |
| Example A20 | 15 | 100.0 | 0.0 | 0.0 | — | — | 339 | 339 | 1.14 | 0.086 |
| Example A21 | 18 | 100.0 | 0.0 | 0.0 | — | — | 1894 | 1894 | 1.14 | 0.095 |
| Example A22 | 15 | 100.0 | 0.0 | 0.0 | — | — | 2320 | 2320 | 1.15 | 0.110 |

TABLE 2

| Sample No. | D50 (nm) | Ratio of Co crystal phase (%) hcp-Co | fcc-Co | ε-Co | Content ratio of additive element α (ppm) Fe/Co | Ni/Co | Cu/Co | $W_\alpha/W_{Co}$ | Magnetic characteristics μ' at 5 GHz | tanδ at 5 GHz |
|---|---|---|---|---|---|---|---|---|---|---|
| Comparative Example A | 16 | 98.2 | 0.0 | 1.8 | — | — | — | — | 1.15 | 0.156 |
| Example B1 | 12 | 99.2 | 0.0 | 0.8 | 6 | 4 | — | 10 | 1.14 | 0.089 |
| Example B2 | 16 | 99.7 | 0.0 | 0.3 | 224 | 10 | — | 234 | 1.14 | 0.086 |
| Example B3 | 14 | 100.0 | 0.0 | 0.0 | 239 | 152 | — | 391 | 1.15 | 0.086 |
| Example B4 | 17 | 100.0 | 0.0 | 0.0 | 244 | 1772 | — | 1989 | 1.14 | 0.086 |
| Example B5 | 16 | 100.0 | 0.0 | 0.0 | 221 | 2272 | — | 2493 | 1.15 | 0.115 |
| Example B6 | 17 | 99.2 | 0.0 | 0.8 | — | 6 | 5 | 11 | 1.14 | 0.085 |
| Example B7 | 16 | 99.7 | 0.0 | 0.3 | — | 112 | 10 | 122 | 1.14 | 0.086 |
| Example B8 | 16 | 100.0 | 0.0 | 0.0 | — | 115 | 152 | 267 | 1.15 | 0.084 |
| Example B9 | 18 | 100.0 | 0.0 | 0.0 | — | 109 | 1884 | 1993 | 1.14 | 0.088 |
| Example B10 | 15 | 100.0 | 0.0 | 0.0 | — | 100 | 2350 | 2450 | 1.15 | 0.121 |
| Example B11 | 17 | 99.2 | 0.0 | 0.8 | 5 | — | 6 | 11 | 1.14 | 0.087 |
| Example B12 | 16 | 99.7 | 0.0 | 0.3 | 10 | — | 103 | 113 | 1.13 | 0.086 |
| Example B13 | 17 | 100.0 | 0.0 | 0.0 | 234 | — | 125 | 359 | 1.15 | 0.085 |
| Example B14 | 12 | 100.0 | 0.0 | 0.0 | 1877 | — | 115 | 1992 | 1.14 | 0.088 |
| Example B15 | 13 | 100.0 | 0.0 | 0.0 | 2350 | — | 124 | 2474 | 1.15 | 0.111 |

TABLE 3

| Sample No. | D50 (nm) | Ratio of Co crystal phase (%) hcp-Co | fcc-Co | ε-Co | Content ratio of additive element α (ppm) Fe/Co | Ni/Co | Cu/Co | $W_\alpha/W_{Co}$ | Magnetic characteristics μ' at 5 GHz | tanδ at 5 GHz |
|---|---|---|---|---|---|---|---|---|---|---|
| Comparative Example A | 16 | 98.2 | 0.0 | 1.8 | — | — | — | — | 1.15 | 0.156 |
| Example C1 | 14 | 99.2 | 0.0 | 0.8 | 4 | 4 | 4 | 12 | 1.14 | 0.088 |
| Example C2 | 17 | 99.7 | 0.0 | 0.3 | 214 | 112 | 6 | 332 | 1.15 | 0.086 |
| Example C3 | 17 | 100.0 | 0.0 | 0.0 | 225 | 107 | 320 | 652 | 1.15 | 0.084 |
| Example C4 | 18 | 100.0 | 0.0 | 0.0 | 222 | 113 | 1611 | 1946 | 1.14 | 0.086 |
| Example C5 | 16 | 100.0 | 0.0 | 0.0 | 226 | 108 | 2291 | 2625 | 1.15 | 0.117 |
| Example C6 | 16 | 99.7 | 0.0 | 0.3 | 224 | 6 | 116 | 346 | 1.14 | 0.088 |
| Example C7 | 17 | 100.0 | 0.0 | 0.0 | 212 | 61 | 112 | 385 | 1.15 | 0.083 |
| Example C8 | 15 | 100.0 | 0.0 | 0.0 | 228 | 1611 | 122 | 1961 | 1.14 | 0.085 |
| Example C9 | 15 | 100.0 | 0.0 | 0.0 | 211 | 2291 | 111 | 2613 | 1.15 | 0.123 |
| Example C10 | 15 | 99.7 | 0.0 | 0.3 | 6 | 115 | 140 | 261 | 1.14 | 0.086 |

TABLE 3-continued

| | Analysis results of metal magnetic powder | | | | | | | | Magnetic characteristics | |
|---|---|---|---|---|---|---|---|---|---|---|
| | D50 | Ratio of Co crystal phase (%) | | | Content ratio of additive element α (ppm) | | | | μ' | tanδ |
| Sample No. | (nm) | hcp-Co | fcc-Co | ε-Co | Fe/Co | Ni/Co | Cu/Co | $W_\alpha/W_{Co}$ | at 5 GHz | at 5 GHz |
| Example C11 | 15 | 100.0 | 0.0 | 0.0 | 388 | 112 | 124 | 624 | 1.15 | 0.083 |
| Example C12 | 15 | 100.0 | 0.0 | 0.0 | 1611 | 112 | 116 | 1839 | 1.14 | 0.087 |
| Example C13 | 18 | 100.0 | 0.0 | 0.0 | 2291 | 112 | 116 | 2519 | 1.15 | 0.122 |

As shown in Table 1, in Comparative Example A that does not include the additive element α, high magnetic permeability was obtained, but the magnetic loss was as large as 0.150 or more, and evaluation criteria of the magnetic characteristics could not be satisfied. In contrast, in Example A1 to Example A22 that include the additive element α, the magnetic loss could be further reduced while securing higher magnetic permeability in comparison to Comparative Example A. From the result, it could be seen that when the metal magnetic powder including hcp-Co nanoparticles includes the additive element α, the high magnetic permeability and the low magnetic loss are compatible with each other at a high-frequency band.

In addition, as shown in Table 2 and Table 3, in Examples (B1 to B15) including two kinds of additive elements α and Examples (C1 to C13) including three kinds of additive elements α, the magnetic loss could also be further reduced in a comparison to Comparative Example A while securing the high magnetic permeability as in examples shown in table 1. From the result, it could be seen that the additive element α added to the metal magnetic powder may be one kind or two or more kinds. Note that, in Table 1 to Table 3, in examples including the additive element α, it could be confirmed that the ratio of hcp-Co is higher in comparison to comparative examples, and it could be seen that the degree of crystallization of hcp-Co is improved.

In addition, among the examples shown in Table 1 to Table 3, in examples satisfying a relationship of 10 ppm≤ $(W_\alpha/W_{Co})$≤2000 ppm, the magnetic loss was less than 0.100. From the result, it could be seen that a ratio of the total content of the additive element α to the content of Co is preferably 10 ppm to 2000 ppm.

Experiment 2

In Experiment 2, metal magnetic powders further including the additive element R in addition to the additive element α were manufactured. Specifically, in Experiment 2, a precursor ($CoCl(Ph_3P)_3$) of Co, the additive material A ($FeCl_2$, $NiCl_2$, and $CuCl_2$), the additive material B including the additive element β, and the solvent (octadecanol) were mixed to prepare a reaction solution, and the metal magnetic powders were manufactured by using the reaction solution.

As the additive material B including the additive element β, borohydride compounds $NaBH_4$, $Mg(BH_4)_2$, and $Ca(BH_4)_2$ were prepared. Only any one kind among the additive materials B was used in Examples D1 to Example D21 shown in Table 4, two kinds of the additive materials B were used in Examples E1 to Example E15 shown in Table 5, and all of three kinds of the additive materials B were used in Example F1 to Example F13 shown in Table 6. In the respective examples in Experiment 2, a blending ratio of the precursor and the additive material B was controlled so that the content ratio of the additive element β becomes a value shown in Table 4 to Table 6.

Note that, in the respective examples in Experiment 2, $FeCl_2$, $NiCl_2$, and $CuCl_2$ were used as the additive materials A, and a blending ratio of the additive material A and the precursor was adjusted so that the content ratio of the additive element α becomes the same as in Example C7 in Experiment 1. That is, in the respective examples in Experiment 2, blending ratios of the respective additives A were controlled so that Fe/Co is within a range of 200±20 ppm, Ni/Co is within a range of 60±10 ppm, Cu/Co is within a range of 110±10 ppm, and $W_\alpha/W_{Co}$ is within a range of 370±20 ppm.

Manufacturing conditions other than the above-described conditions (manufacturing conditions other than the conditions relating to the additive materials B) were set to be similar as in Example C7 in Experiment 1. In Experiment 2, the average particle size (D50) of the nanoparticles and the composition of the metal magnetic powder were also measured by a similar method as in Experiment 1. In addition, X-ray diffraction charts of the metal magnetic powders according to the respective examples were analyzed by a similar method as in Experiment 1 to calculate a ratio of the Co crystal phase. From analysis results of the metal magnetic powder, it could be confirmed that any of the metal magnetic powders relating to the respective examples in Experiment 2 includes Co as a main component, and includes hcp-Co as a main phase. Detailed evaluation results are shown in Table 4 to Table 6. Note that, "-" shown in a column of the content ratio of the additive element β represents that the content ratio of a target element is less than a defined amount, and the element is determined as not being included in the metal magnetic powder (a defined amount of Na/Co and Mg/Co is 1 ppm and a defined amount of Ca/Co is 5 ppm).

In addition, in Experiment 2, composite magnetic bodies according to the respective examples were also manufactured under similar manufacturing conditions as in Experiment 1. Then, the composite magnetic bodies were analyzed by a similar method as in Experiment 1, and the magnetic characteristics of the composite magnetic bodies were measured. In the respective examples in Experiment 2, from results of spot analysis, line analysis, and mapping analysis by TEM-EDS, it could be confirmed that the metal magnetic powder in the composite magnetic body includes the additive element α and the additive element β as intended. That is, a characteristic X-ray of the additive element α and a characteristic X-ray of the additive element β were detected at the inside and/or on the surface of any analysis particle among analysis particles set as an analysis target.

TABLE 4

| Sample No. | D50 (nm) | Ratio of Co crystal phase (%): hcp-Co | fcc-Co | ε-Co | Content ratio of additive element α (ppm): Fe/Co | Ni/Co | Cu/Co | $W_{\alpha}/W_{Co}$ | Content ratio of additive element ß (ppm): Na/Co | Mg/Co | Ca/Co | $W_{\beta}/W_{Co}$ | Magnetic characteristics: μ' at 5 GHz | tanδ at 5 GHz |
|---|---|---|---|---|---|---|---|---|---|---|---|---|---|---|
| | | Analysis results of metal magnetic powder | | | | | | | | | | | | |
| Example C7 | 17 | 100.0 | 0.0 | 0.0 | 212 | 61 | 112 | 385 | — | — | — | — | 1.15 | 0.083 |
| Example D1 | 17 | 99.2 | 0.0 | 0.8 | 203 | 61 | 109 | 373 | 6 | — | — | 6 | 1.19 | 0.087 |
| Example D2 | 17 | 99.2 | 0.0 | 0.8 | 197 | 64 | 106 | 367 | 13 | — | — | 13 | 1.19 | 0.081 |
| Example D3 | 15 | 99.1 | 0.0 | 0.9 | 205 | 61 | 115 | 381 | 105 | — | — | 105 | 1.22 | 0.073 |
| Example D4 | 13 | 99.3 | 0.0 | 0.7 | 201 | 58 | 112 | 371 | 362 | — | — | 362 | 1.23 | 0.071 |
| Example D5 | 14 | 99.3 | 0.0 | 0.7 | 200 | 61 | 108 | 369 | 780 | — | — | 780 | 1.22 | 0.076 |
| Example D6 | 14 | 99.2 | 0.0 | 0.8 | 197 | 58 | 106 | 361 | 1489 | — | — | 1489 | 1.23 | 0.078 |
| Example D7 | 16 | 99.1 | 0.0 | 0.9 | 205 | 63 | 116 | 384 | 1903 | — | — | 1903 | 1.23 | 0.082 |
| Example D8 | 14 | 100.0 | 0.0 | 0.0 | 203 | 52 | 115 | 370 | — | 8 | — | 8 | 1.18 | 0.088 |
| Example D9 | 12 | 100.0 | 0.0 | 0.0 | 202 | 56 | 114 | 372 | — | 12 | — | 12 | 1.20 | 0.078 |
| Example D10 | 18 | 100.0 | 0.0 | 0.0 | 203 | 63 | 106 | 372 | — | 97 | — | 97 | 1.20 | 0.075 |
| Example D11 | 14 | 100.0 | 0.0 | 0.0 | 199 | 63 | 114 | 376 | — | 364 | — | 364 | 1.21 | 0.072 |
| Example D12 | 17 | 100.0 | 0.0 | 0.0 | 195 | 52 | 113 | 360 | — | 805 | — | 805 | 1.22 | 0.071 |
| Example D13 | 12 | 100.0 | 0.0 | 0.0 | 195 | 56 | 112 | 363 | — | 1487 | — | 1487 | 1.22 | 0.078 |
| Example D14 | 16 | 100.0 | 0.0 | 0.0 | 199 | 63 | 118 | 380 | — | 1900 | — | 1900 | 1.23 | 0.082 |
| Example D15 | 18 | 100.0 | 0.0 | 0.0 | 195 | 59 | 113 | 367 | — | — | 6 | 6 | 1.17 | 0.087 |
| Example D16 | 15 | 100.0 | 0.0 | 0.0 | 207 | 57 | 111 | 375 | — | — | 11 | 11 | 1.19 | 0.077 |
| Example D17 | 13 | 100.0 | 0.0 | 0.0 | 206 | 62 | 118 | 386 | — | — | 95 | 95 | 1.20 | 0.078 |
| Example D18 | 13 | 100.0 | 0.0 | 0.0 | 197 | 58 | 113 | 368 | — | — | 363 | 363 | 1.20 | 0.068 |
| Example D19 | 16 | 100.0 | 0.0 | 0.0 | 207 | 52 | 106 | 365 | — | — | 805 | 805 | 1.22 | 0.075 |
| Example D20 | 12 | 100.0 | 0.0 | 0.0 | 200 | 57 | 106 | 363 | — | — | 1492 | 1492 | 1.22 | 0.073 |
| Example D21 | 12 | 100.0 | 0.0 | 0.0 | 201 | 56 | 113 | 370 | — | — | 1899 | 1899 | 1.22 | 0.079 |

TABLE 5

| Sample No. | D50 (nm) | Ratio of Co crystal phase (%): hcp-Co | fcc-Co | ε-Co | Content ratio of additive element α (ppm): Fe/Co | Ni/Co | Cu/Co | $W_{\alpha}/W_{Co}$ | Content ratio of additive element ß (ppm): Na/Co | Mg/Co | Ca/Co | $W_{\beta}/W_{Co}$ | Magnetic characteristics: μ' at 5 GHz | tanδ at 5 GHz |
|---|---|---|---|---|---|---|---|---|---|---|---|---|---|---|
| | | Analysis results of metal magnetic powder | | | | | | | | | | | | |
| Example C7 | 17 | 100.0 | 0.0 | 0.0 | 212 | 61 | 112 | 385 | — | — | — | — | 1.15 | 0.083 |
| Example E1 | 11 | 100.0 | 0.0 | 0.0 | 196 | 60 | 118 | 374 | 4 | 3 | — | 7 | 1.15 | 0.090 |
| Example E2 | 15 | 100.0 | 0.0 | 0.0 | 198 | 64 | 106 | 368 | 6 | 6 | — | 12 | 1.19 | 0.081 |
| Example E3 | 13 | 100.0 | 0.0 | 0.0 | 207 | 59 | 117 | 383 | 82 | 525 | — | 607 | 1.22 | 0.072 |
| Example E4 | 16 | 100.0 | 0.0 | 0.0 | 197 | 64 | 111 | 372 | 82 | 1413 | — | 1495 | 1.22 | 0.073 |
| Example E5 | 18 | 100.0 | 0.0 | 0.0 | 203 | 57 | 115 | 375 | 82 | 1887 | — | 1969 | 1.21 | 0.078 |
| Example E6 | 20 | 100.0 | 0.0 | 0.0 | 200 | 58 | 118 | 376 | — | 3 | 5 | 8 | 1.15 | 0.089 |
| Example E7 | 16 | 100.0 | 0.0 | 0.0 | 196 | 58 | 107 | 361 | — | 7 | 5 | 12 | 1.19 | 0.078 |
| Example E8 | 14 | 100.0 | 0.0 | 0.0 | 195 | 56 | 111 | 362 | — | 18 | 515 | 533 | 1.22 | 0.073 |
| Example E9 | 13 | 100.0 | 0.0 | 0.0 | 197 | 64 | 111 | 372 | — | 18 | 1473 | 1491 | 1.22 | 0.076 |
| Example E10 | 12 | 100.0 | 0.0 | 0.0 | 206 | 57 | 107 | 370 | — | 18 | 1992 | 2010 | 1.21 | 0.079 |
| Example E11 | 15 | 100.0 | 0.0 | 0.0 | 197 | 56 | 118 | 371 | 2 | — | 5 | 7 | 1.15 | 0.089 |
| Example E12 | 13 | 100.0 | 0.0 | 0.0 | 202 | 56 | 108 | 366 | 6 | — | 6 | 12 | 1.19 | 0.078 |
| Example E13 | 15 | 100.0 | 0.0 | 0.0 | 201 | 64 | 116 | 381 | 518 | — | 353 | 871 | 1.20 | 0.075 |
| Example E14 | 16 | 100.0 | 0.0 | 0.0 | 200 | 64 | 117 | 381 | 1131 | — | 353 | 1484 | 1.22 | 0.078 |
| Example E15 | 14 | 100.0 | 0.0 | 0.0 | 203 | 59 | 106 | 368 | 1791 | — | 353 | 2144 | 1.21 | 0.083 |

TABLE 6

| Sample No. | D50 (nm) | Ratio of Co crystal phase (%): hcp-Co | fcc-Co | ε-Co | Content ratio of additive element α (ppm): Fe/Co | Ni/Co | Cu/Co | $W_{\alpha}/W_{Co}$ | Content ratio of additive element ß (ppm): Na/Co | Mg/Co | Ca/Co | $W_{\beta}/W_{Co}$ | Magnetic characteristics: μ 'at 5 GHz | tanδat 5 GHz |
|---|---|---|---|---|---|---|---|---|---|---|---|---|---|---|
| | | Analysis results of metal magnetic powder | | | | | | | | | | | | |
| Example C7 | 17 | 100.0 | 0.0 | 0.0 | 212 | 61 | 112 | 385 | — | — | — | — | 1.15 | 0.083 |
| Example F1 | 12 | 99.2 | 0.0 | 0.8 | 196 | 55 | 113 | 364 | 1 | 1 | 5 | 7 | 1.14 | 0.087 |
| Example F2 | 12 | 100.0 | 0.0 | 0.0 | 202 | 63 | 112 | 377 | 5 | 5 | 5 | 15 | 1.19 | 0.078 |
| Example F3 | 18 | 100.0 | 0.0 | 0.0 | 195 | 61 | 114 | 370 | 82 | 11 | 522 | 615 | 1.20 | 0.069 |

TABLE 6-continued

| | Analysis results of metal magnetic powder | | | | | | | | | | | | | Magnetic characteristics | |
|---|---|---|---|---|---|---|---|---|---|---|---|---|---|---|---|
| | | Ratio of Co crystal phase (%) | | | Content ratio of additive element α (ppm) | | | | Content ratio of additive element ß (ppm) | | | | | | |
| Sample No. | D50 (nm) | hcp-Co | fcc-Co | ε-Co | Fe/Co | Ni/Co | Cu/Co | $W_\alpha/W_{Co}$ | Na/Co | Mg/Co | Ca/Co | $W_\beta/W_{Co}$ | μ 'at 5 GHz | tanδat 5 GHz |
| Example F4 | 18 | 100.0 | 0.0 | 0.0 | 201 | 59 | 112 | 372 | 82 | 11 | 1134 | 1227 | 1.22 | 0.075 |
| Example F5 | 16 | 100.0 | 0.0 | 0.0 | 198 | 62 | 107 | 367 | 82 | 11 | 1796 | 1889 | 1.21 | 0.078 |
| Example F6 | 14 | 99.0 | 0.0 | 1.0 | 206 | 57 | 117 | 380 | 5 | 2 | 5 | 12 | 1.14 | 0.077 |
| Example F7 | 15 | 100.0 | 0.0 | 0.0 | 203 | 58 | 118 | 379 | 82 | 65 | 353 | 500 | 1.20 | 0.069 |
| Example F8 | 17 | 100.0 | 0.0 | 0.0 | 198 | 59 | 112 | 369 | 82 | 1036 | 353 | 1471 | 1.22 | 0.077 |
| Example F9 | 14 | 100.0 | 0.0 | 0.0 | 196 | 52 | 117 | 365 | 82 | 1563 | 353 | 1998 | 1.21 | 0.079 |
| Example F10 | 17 | 100.0 | 0.0 | 0.0 | 199 | 62 | 108 | 369 | 2 | 4 | 5 | 11 | 1.15 | 0.077 |
| Example F11 | 13 | 100.0 | 0.0 | 0.0 | 195 | 62 | 115 | 372 | 86 | 11 | 353 | 450 | 1.20 | 0.070 |
| Example F12 | 12 | 100.0 | 0.0 | 0.0 | 199 | 52 | 110 | 361 | 1134 | 11 | 353 | 1498 | 1.22 | 0.076 |
| Example F13 | 18 | 100.0 | 0.0 | 0.0 | 199 | 59 | 116 | 374 | 1657 | 11 | 353 | 2021 | 1.21 | 0.081 |

As shown in Table 4, in Examples D1 to D21 including the additive element β, the magnetic characteristics at 5 GHz were further improved in comparison to Example C7 that does not include the additive element β. Particularly, in examples in which $W_\beta/W_{Co}$ is 10 ppm to 1500 ppm, at 5 GHz, the magnetic permeability could be further improved in comparison to Example C7, and the magnetic loss could be further reduced in comparison to Example C7. That is, from the results in Table 4, it could be seen that additional improvement of the magnetic permeability and the magnetic loss can be accomplished due to the additive element β, and the content ratio ($W_\beta/W_{Co}$) of the additive element β is preferably 10 ppm to 1500 ppm.

In addition, as shown in Table 5 and Table 6, in Examples (E1 to E15) including two kinds of the additive elements β, and Examples (F1 to F13) including three kinds of the additive elements β, the high magnetic permeability and the low magnetic loss could also be more appropriately compatible with each other as in examples in Table 4. From the results, it could be seen that the additive element β that is added to the metal magnetic powder may be only one kind or two or more kinds.

Experiment 3

In Experiment 3, metal magnetic powders including the additive element α and the additive element β in ratios shown in Table 7 to Table 9 were manufactured. In Experiment 2, the content ratio of the additive element β was changed without changing the content ratio of the additive element α, but in Experiment 3, the content ratio of the additive element α was changed without changing the content ratio of the additive element β in contrast to Experiment 2. Specifically, in respective examples in Experiment 3, blending ratios of the additive material B ($NaBH_4$, $Mg(BH_4)_2$, and $Ca(BH_4)_2$) were controlled so that Na/Co is within a range of 80±10 ppm, Mg/Co is within a range of 10±5 ppm, Ca/Co is within a range of 350±10 ppm, and $W_\beta/W_{Co}$ is within a range of 440±20 ppm.

Then, only any one kind among the three kinds of additive materials A ($FeCl_2$, $NiCl_2$, and $CuCl_2$) was used in Example G1 to Example G19 shown in Table 7, two kinds of the additive materials A among the additive materials A were used in Example H1 to Example H18 shown in Table 8, and all of the three kinds of additive materials A were used in Example I1 to Example I13 shown in Table 9. A blending ratio of the precursor and the additive material A was controlled so that the content ratio of the additive element α becomes values shown in Table 7 to Table 9. Note that, in Comparative Example G in Experiment 3, only the additive material B was used without using the additive material A, and a metal magnetic powder that does not include the additive element α and includes the additive element β was obtained.

Manufacturing conditions other than the above-described conditions (manufacturing conditions other than the blending ratios of the additive materials (A and B) were set to be similar as in Experiment 2, and in Experiment 3, the average particle size (D50) of the nanoparticles and the composition of the metal magnetic powder were also measured by a similar method as in Experiment 1. In addition, X-ray diffraction charts of the metal magnetic powders according to the respective examples were analyzed by a similar method as in Experiment 1 to calculate a ratio of the Co crystal phase. From analysis results of the metal magnetic powder, it could be confirmed that any of the metal magnetic powders relating to the respective examples in Experiment 3 includes Co as a main component, and includes hcp-Co as a main phase. Detailed analysis results are shown in Table 7 to Table 9.

In addition, in Experiment 3, composite magnetic bodies according to the respective examples were also manufactured under similar conditions as in Experiment 1. Then, the composite magnetic bodies were analyzed by a similar method as in Experiment 1, and the magnetic characteristics of the composite magnetic bodies were measured. In the respective examples in Experiment 3, from results of spot analysis, line analysis, and mapping analysis by TEM-EDS, it could be confirmed that the metal magnetic powder in the composite magnetic body includes the additive element α and the additive element β as intended. That is, a characteristic X-ray of the additive element α and a characteristic X-ray of the additive element β were detected at the inside and/or on the surface of any analysis particle among analysis particles set as an analysis target.

TABLE 7

| | Analysis results of metal magnetic powder | | | | | | | | | | | | Magnetic characteristics | |
|---|---|---|---|---|---|---|---|---|---|---|---|---|---|---|
| | D50 | Ratio of Co crystal phase (%) | | | Content ratio of additive element α (ppm) | | | | Content ratio of additive element ß (ppm) | | | | μ' at | tanδ at |
| Sample No. | (nm) | hcp-Co | fcc-Co | ε-Co | Fe/Co | Ni/Co | Cu/Co | $W_\alpha/W_{Co}$ | Na/Co | Mg/Co | Ca/Co | $W_\beta/W_{Co}$ | 5 GHz | 5 GHz |
| Comparative Example G | 15 | 98.2 | 0.0 | 1.8 | — | — | — | — | 81 | 11 | 352 | 444 | 1.18 | 0.156 |
| Example G1 | 17 | 99.1 | 0.0 | 0.9 | 10 | — | — | 10 | 87 | 10 | 350 | 447 | 1.20 | 0.088 |
| Example G2 | 17 | 100.0 | 0.0 | 0.0 | 70 | — | — | 70 | 85 | 12 | 350 | 447 | 1.22 | 0.077 |
| Example G3 | 16 | 100.0 | 0.0 | 0.0 | 157 | — | — | 157 | 87 | 13 | 348 | 448 | 1.21 | 0.070 |
| Example G4 | 16 | 100.0 | 0.0 | 0.0 | 339 | — | — | 339 | 80 | 13 | 353 | 446 | 1.21 | 0.076 |
| Example G5 | 13 | 100.0 | 0.0 | 0.0 | 997 | — | — | 997 | 81 | 11 | 358 | 450 | 1.23 | 0.070 |
| Example G6 | 13 | 100.0 | 0.0 | 0.0 | 1989 | — | — | 1989 | 81 | 11 | 352 | 444 | 1.22 | 0.083 |
| Example G7 | 15 | 100.0 | 0.0 | 0.0 | 2298 | — | — | 2298 | 88 | 11 | 358 | 457 | 1.23 | 0.110 |
| Example G8 | 17 | 99.3 | 0.0 | 0.7 | — | 7 | — | 7 | 79 | 9 | 357 | 445 | 1.18 | 0.083 |
| Example G9 | 17 | 99.8 | 0.0 | 0.2 | — | 98 | — | 98 | 78 | 13 | 352 | 443 | 1.20 | 0.084 |
| Example G10 | 15 | 100.0 | 0.0 | 0.0 | — | 156 | — | 156 | 88 | 10 | 349 | 447 | 1.23 | 0.072 |
| Example G11 | 15 | 100.0 | 0.0 | 0.0 | — | 342 | — | 342 | 80 | 10 | 356 | 446 | 1.21 | 0.070 |
| Example G12 | 12 | 100.0 | 0.0 | 0.0 | — | 1996 | — | 1996 | 76 | 12 | 349 | 437 | 1.21 | 0.083 |
| Example G13 | 15 | 100.0 | 0.0 | 0.0 | — | 2350 | — | 2350 | 79 | 11 | 350 | 440 | 1.20 | 0.122 |
| Example G14 | 14 | 99.2 | 0.0 | 0.8 | — | — | 10 | 10 | 81 | 10 | 357 | 448 | 1.20 | 0.091 |
| Example G15 | 16 | 99.7 | 0.0 | 0.3 | — | — | 101 | 101 | 88 | 13 | 351 | 452 | 1.22 | 0.085 |
| Example G16 | 16 | 100.0 | 0.0 | 0.0 | — | — | 152 | 152 | 84 | 11 | 349 | 444 | 1.23 | 0.076 |
| Example G17 | 18 | 100.0 | 0.0 | 0.0 | — | — | 336 | 336 | 79 | 12 | 357 | 448 | 1.21 | 0.067 |
| Example G18 | 16 | 100.0 | 0.0 | 0.0 | — | — | 1890 | 1890 | 76 | 10 | 357 | 443 | 1.22 | 0.080 |
| Example G19 | 13 | 100.0 | 0.0 | 0.0 | — | — | 2320 | 2320 | 86 | 10 | 351 | 447 | 1.21 | 0.117 |

TABLE 8

| | Analysis results of metal magnetic powder | | | | | | | | | | | | Magnetic characteristics | |
|---|---|---|---|---|---|---|---|---|---|---|---|---|---|---|
| | D50 | Ratio of Co crystal phase (%) | | | Content ratio of additive element α (ppm) | | | | Content ratio of additive element ß (ppm) | | | | μ' at | tanδ at |
| Sample No. | (nm) | hcp-Co | fcc-Co | ε-Co | Fe/Co | Ni/Co | Cu/Co | $W_\alpha/W_{Co}$ | Na/Co | Mg/Co | Ca/Co | $W_\beta/W_{Co}$ | 5 GHz | 5 GHz |
| Comparative Example G | 15 | 98.2 | 0.0 | 1.8 | — | — | — | — | 81 | 11 | 352 | 444 | 1.18 | 0.156 |
| Example H1 | 14 | 98.1 | 0.0 | 1.9 | 4 | 2 | — | 6 | 79 | 9 | 353 | 441 | 1.20 | 0.140 |
| Example H2 | 15 | 99.2 | 0.0 | 0.8 | 6 | 4 | — | 10 | 86 | 12 | 359 | 457 | 1.19 | 0.078 |
| Example H3 | 12 | 99.7 | 0.0 | 0.3 | 224 | 10 | — | 234 | 77 | 12 | 357 | 446 | 1.22 | 0.072 |
| Example H4 | 14 | 100.0 | 0.0 | 0.0 | 234 | 149 | — | 383 | 87 | 10 | 356 | 453 | 1.24 | 0.077 |
| Example H5 | 18 | 100.0 | 0.0 | 0.0 | 225 | 1763 | — | 1988 | 79 | 13 | 352 | 444 | 1.24 | 0.078 |
| Example H6 | 12 | 100.0 | 0.0 | 0.0 | 215 | 2269 | — | 2484 | 83 | 10 | 352 | 445 | 1.24 | 0.114 |
| Example H7 | 16 | 99.0 | 0.0 | 1.0 | — | 3 | 4 | 7 | 87 | 9 | 358 | 454 | 1.18 | 0.143 |
| Example H8 | 13 | 99.2 | 0.0 | 0.8 | — | 4 | 5 | 9 | 76 | 9 | 348 | 433 | 1.22 | 0.089 |
| Example H9 | 16 | 99.7 | 0.0 | 0.3 | — | 121 | 10 | 131 | 81 | 13 | 347 | 441 | 1.21 | 0.072 |
| Example H10 | 18 | 100.0 | 0.0 | 0.0 | — | 106 | 150 | 256 | 82 | 9 | 351 | 442 | 1.22 | 0.067 |
| Example H11 | 13 | 100.0 | 0.0 | 0.0 | — | 107 | 1882 | 1989 | 80 | 11 | 354 | 445 | 1.21 | 0.076 |
| Example H12 | 17 | 100.0 | 0.0 | 0.0 | — | 121 | 2353 | 2474 | 82 | 11 | 359 | 452 | 1.24 | 0.115 |
| Example H13 | 16 | 98.3 | 0.0 | 1.7 | 3 | — | 5 | 8 | 80 | 10 | 356 | 446 | 1.22 | 0.136 |
| Example H14 | 18 | 99.2 | 0.0 | 0.8 | 5 | — | 6 | 11 | 81 | 13 | 351 | 445 | 1.21 | 0.075 |
| Example H15 | 16 | 99.7 | 0.0 | 0.3 | 10 | — | 116 | 126 | 79 | 10 | 351 | 440 | 1.22 | 0.075 |
| Example H16 | 17 | 100.0 | 0.0 | 0.0 | 237 | — | 112 | 349 | 81 | 9 | 354 | 444 | 1.23 | 0.076 |
| Example H17 | 16 | 100.0 | 0.0 | 0.0 | 1882 | — | 111 | 1993 | 79 | 10 | 358 | 447 | 1.21 | 0.085 |
| Example H18 | 13 | 100.0 | 0.0 | 0.0 | 2352 | — | 115 | 2467 | 88 | 10 | 356 | 454 | 1.22 | 0.113 |

TABLE 9

| | Analysis results of metal magnetic powder | | | | | | | | | | | | Magnetic characteristics | |
|---|---|---|---|---|---|---|---|---|---|---|---|---|---|---|
| | D50 | Ratio of Co crystal phase (%) | | | Content ratio of additive element α (ppm) | | | | Content ratio of additive element ß (ppm) | | | | μ' at | tanδ at |
| Sample No. | (nm) | hcp-Co | fcc-Co | ε-Co | Fe/Co | Ni/Co | Cu/Co | $W_\alpha/W_{Co}$ | Na/Co | Mg/Co | Ca/Co | $W_\beta/W_{Co}$ | 5 GHz | 5 GHz |
| Comparative Example G | 15 | 98.2 | 0.0 | 1.8 | — | — | — | — | 81 | 11 | 352 | 444 | 1.18 | 0.156 |
| Example I1 | 17 | 99.2 | 0.0 | 0.8 | 4 | 4 | 4 | 12 | 77 | 9 | 359 | 445 | 1.21 | 0.085 |
| Example I2 | 15 | 99.7 | 0.0 | 0.3 | 224 | 112 | 6 | 342 | 88 | 11 | 357 | 456 | 1.22 | 0.074 |

TABLE 9-continued

| | Analysis results of metal magnetic powder | | | | | | | | | | | | | Magnetic characteristics | |
|---|---|---|---|---|---|---|---|---|---|---|---|---|---|---|---|
| | | Ratio of Co crystal phase (%) | | | Content ratio of additive element α (ppm) | | | | Content ratio of additive element β (ppm) | | | | | | |
| Sample No. | D50 (nm) | hcp-Co | fcc-Co | ε-Co | Fe/Co | Ni/Co | Cu/Co | $W_\alpha/W_{Co}$ | Na/Co | Mg/Co | Ca/Co | $W_\beta/W_{Co}$ | | μ' at 5 GHz | tanδ at 5 GHz |
| Example I3 | 16 | 100.0 | 0.0 | 0.0 | 216 | 111 | 122 | 449 | 78 | 9 | 357 | 444 | | 1.22 | 0.077 |
| Example I4 | 17 | 100.0 | 0.0 | 0.0 | 230 | 104 | 1618 | 1952 | 84 | 13 | 353 | 450 | | 1.23 | 0.076 |
| Example I5 | 13 | 100.0 | 0.0 | 0.0 | 214 | 113 | 2297 | 2624 | 79 | 13 | 353 | 445 | | 1.23 | 0.111 |
| Example I6 | 18 | 99.7 | 0.0 | 0.3 | 198 | 4 | 109 | 311 | 84 | 10 | 353 | 447 | | 1.20 | 0.075 |
| Example I7 | 13 | 100.0 | 0.0 | 0.0 | 226 | 71 | 121 | 418 | 79 | 10 | 359 | 448 | | 1.23 | 0.069 |
| Example I8 | 15 | 100.0 | 0.0 | 0.0 | 229 | 1602 | 116 | 1947 | 84 | 12 | 347 | 443 | | 1.24 | 0.092 |
| Example I9 | 15 | 100.0 | 0.0 | 0.0 | 231 | 2281 | 116 | 2628 | 77 | 10 | 358 | 445 | | 1.21 | 0.114 |
| Example I10 | 13 | 99.7 | 0.0 | 0.3 | 6 | 115 | 114 | 235 | 87 | 12 | 350 | 449 | | 1.23 | 0.087 |
| Example I11 | 14 | 100.0 | 0.0 | 0.0 | 124 | 102 | 112 | 338 | 86 | 11 | 352 | 449 | | 1.21 | 0.088 |
| Example I12 | 17 | 100.0 | 0.0 | 0.0 | 1607 | 102 | 119 | 1828 | 88 | 12 | 353 | 453 | | 1.23 | 0.093 |
| Example I13 | 17 | 100.0 | 0.0 | 0.0 | 2284 | 112 | 116 | 2512 | 76 | 12 | 356 | 444 | | 1.22 | 0.106 |

In Comparative Example e in Experiment 3, high magnetic permeability was obtained at 5 GHz, but the magnetic loss was as large as 0.150 or more, and evaluation criteria of the magnetic characteristics could not be satisfied. That is, from results of Comparative Example G, it could be seen that when adding only the additive element β to the metal magnetic powder without adding the additive element α, compatibility between the high magnetic permeability and the low magnetic loss is not accomplished. On the other hand, in examples shown in Table 7 to Table 9 (examples including the additive element α and the additive element β), the high magnetic permeability and the low magnetic loss could be more appropriately compatible with each other at a high frequency band as in Experiment 2.

Experiment 4

In Experiment 4, metal magnetic powders shown in Table 10 and Table 11 were manufactured by changing manufacturing conditions such as a reaction temperature and reaction time in the pyrolysis. Specifically, in the experiment shown in Table 10, $CoCl(Ph_3P)_3$ as a precursor was pyrolyzed in octadecanol (solvent), and the reaction temperature and the reaction time at that time were changed to manufacture metal magnetic powders different in the average particle size (D50). The additive material A and the additive material B were not used in Comparative Examples J1 to Comparative Example J6 in Table 10, three kinds of the additive materials A ($FeCl_2$, $NiCl_2$, and, $CuCl_2$) were used in Example J1 to Example J5, and Comparative Example J7, and three kinds of the additive materials A and three kinds of the additive materials B ($NaBH_4$, $Mg(BH_4)_2$, and $Ca(BH_4)_2$) were used in Example J6 to Example J10, and Comparative Example J8.

On the other hand, in the experiment shown in Table 11, a precursor and a solvent which are different from those in the experiment in Table 10 were used. Specifically, $Co_2(CO)_8$ as a precursor was pyrolyzed in an ethanol solvent heated to 60° C., and reaction time at that time was changed to manufacture metal magnetic powders different in the average particle size (D50). The additive material A and the additive material B were not used in Comparative Example K1 to Comparative Example K7 in Table 11, three kinds of the additive materials A were used in Example K1 to Example K6, and Comparative Example K8, and three kinds of the additive materials A and three kinds of the additive materials B were used in Example K7 to Example K12, and Comparative Example K9.

Manufacturing conditions other than the conditions shown in Table 10 and Table 11 were set to be similar as in Experiment 1, and in Experiment 4, the average particle size (D50) of the nanoparticles and the composition of the metal magnetic powder were also measured by a similar method as in Experiment 1. In addition, X-ray diffraction charts of the metal magnetic powders according to the respective examples were analyzed by a similar method as in Experiment 1 to calculate a ratio of the Co crystal phase. From analysis results of the metal magnetic powder, it could be confirmed that any of the metal magnetic powders relating to the respective examples in Experiment 4 includes Co as a main component, and includes hcp-Co as a main phase. Detailed evaluation results are shown in Table 10 to Table 11.

In addition, in Experiment 4, composite magnetic bodies according to the respective examples and respective comparative examples were also manufactured under similar manufacturing conditions as in Experiment 1. Then, the composite magnetic bodies were analyzed by a similar method as in Experiment 1, and the magnetic characteristics of the composite magnetic bodies were measured. In the respective examples in Experiment 4, from results of spot analysis, line analysis, and mapping analysis by TEM-EDS, it could be confirmed that the metal magnetic powder in the composite magnetic body includes the additive element α and the additive element β as intended. That is, a characteristic X-ray of the additive element α and a characteristic X-ray of the additive element β were detected at the inside and/or on the surface of any analysis particle among analysis particles set as an analysis target.

In the respective examples in Experiment 4, the content ratio of the additive element α and the content ratio of the additive element β were controlled to optimal ranges in consideration of the evaluation results in Experiment 1 to Experiment 3, and the magnetic characteristics were evaluated with striker criteria in comparison to Experiment 1. Specifically, in Experiment 4, a sample in which the magnetic permeability is 1.10 or more, and the magnetic loss is 0.100 or less was determined as "satisfactory".

TABLE 10

| Sample No. | Powder manufacturing conditions: Precursor | Solvent | Reaction temperature (° C.) | Reaction time (h) | Analysis results of metal magnetic powder: D50 (nm) | Ratio of Co crystal phase (%): hcp-Co | fcc-Co | ε-Co | Content ratio of additive element α (ppm): Fe/Co | Ni/Co | Cu/Co | $W_\alpha/W_{Co}$ | Content ratio of additive element ß (ppm): Na/Co | Mg/Co | Ca/Co | $W_\beta/W_{Co}$ | Magnetic characteristics: μ' at 5 GHz | tanδ at 5 GHz |
|---|---|---|---|---|---|---|---|---|---|---|---|---|---|---|---|---|---|---|
| Comparative Example J1 | $CoCl(Ph_3P)_3$ | Octadecanol | 80 | 1 | 2 | 98.2 | 0.0 | 1.8 | — | — | — | — | — | — | — | — | 1.15 | 0.164 |
| Comparative Example J2 | $CoCl(Ph_3P)_3$ | Octadecanol | 80 | 10 | 8 | 99.1 | 0.0 | 0.9 | — | — | — | — | — | — | — | — | 1.14 | 0.162 |
| Comparative Example A | $CoCl(Ph_3P)_3$ | Octadecanol | 150 | 1 | 16 | 98.2 | 0.0 | 1.8 | — | — | — | — | — | — | — | — | 1.15 | 0.156 |
| Comparative Example J3 | $CoCl(Ph_3P)_3$ | Octadecanol | 180 | 1 | 21 | 98.2 | 0.0 | 1.8 | — | — | — | — | — | — | — | — | 1.15 | 0.155 |
| Comparative Example J4 | $CoCl(Ph_3P)_3$ | Octadecanol | 180 | 5 | 60 | 98.1 | 0.0 | 1.9 | — | — | — | — | — | — | — | — | 1.16 | 0.160 |
| Comparative Example J5 | $CoCl(Ph_3P)_3$ | Octadecanol | 210 | 8 | 99 | 98.3 | 0.0 | 1.7 | — | — | — | — | — | — | — | — | 1.17 | 0.165 |
| Comparative Example J6 | $CoCl(Ph_3P)_3$ | Octadecanol | 210 | 20 | 122 | 98.2 | 0.0 | 1.8 | — | — | — | — | — | — | — | — | 1.23 | 0.235 |
| Example J1 | $CoCl(Ph_3P)_3$ | Octadecanol | 80 | 1 | 1 | 100.0 | 0.0 | 0.0 | 201 | 58 | 112 | 371 | — | — | — | — | 1.14 | 0.087 |
| Example J2 | $CoCl(Ph_3P)_3$ | Octadecanol | 80 | 10 | 9 | 100.0 | 0.0 | 0.0 | 202 | 60 | 112 | 374 | — | — | — | — | 1.15 | 0.086 |
| Example C7 | $CoCl(Ph_3P)_3$ | Octadecanol | 150 | 1 | 17 | 100.0 | 0.0 | 0.0 | 212 | 61 | 112 | 385 | — | — | — | — | 1.15 | 0.083 |
| Example J3 | $CoCl(Ph_3P)_3$ | Octadecanol | 180 | 1 | 25 | 100.0 | 0.0 | 0.0 | 197 | 61 | 113 | 371 | — | — | — | — | 1.15 | 0.084 |
| Example J4 | $CoCl(Ph_3P)_3$ | Octadecanol | 180 | 5 | 65 | 100.0 | 0.0 | 0.0 | 202 | 58 | 116 | 376 | — | — | — | — | 1.16 | 0.085 |
| Example J5 | $CoCl(Ph_3P)_3$ | Octadecanol | 210 | 8 | 98 | 100.0 | 0.0 | 0.0 | 200 | 55 | 114 | 369 | — | — | — | — | 1.17 | 0.088 |
| Comparative Example J7 | $CoCl(Ph_3P)_3$ | Octadecanol | 210 | 20 | 123 | 100.0 | 0.0 | 0.0 | 199 | 55 | 116 | 370 | — | — | — | — | 1.22 | 0.125 |
| Example J6 | $CoCl(Ph_3P)_3$ | Octadecanol | 80 | 1 | 2 | 100.0 | 0.0 | 0.0 | 198 | 65 | 116 | 379 | 81 | 11 | 352 | 444 | 1.20 | 0.076 |
| Example J7 | $CoCl(Ph_3P)_3$ | Octadecanol | 80 | 10 | 7 | 100.0 | 0.0 | 0.0 | 203 | 65 | 110 | 378 | 77 | 9 | 356 | 442 | 1.21 | 0.075 |
| Example I7 | $CoCl(Ph_3P)_3$ | Octadecanol | 150 | 1 | 13 | 100.0 | 0.0 | 0.0 | 226 | 71 | 121 | 418 | 79 | 10 | 359 | 448 | 1.23 | 0.069 |
| Example J8 | $CoCl(Ph_3P)_3$ | Octadecanol | 180 | 1 | 23 | 100.0 | 0.0 | 0.0 | 198 | 56 | 109 | 363 | 75 | 13 | 344 | 432 | 1.22 | 0.068 |
| Example J9 | $CoCl(Ph_3P)_3$ | Octadecanol | 180 | 5 | 62 | 100.0 | 0.0 | 0.0 | 194 | 61 | 120 | 375 | 75 | 11 | 348 | 434 | 1.24 | 0.073 |
| Example J10 | $CoCl(Ph_3P)_3$ | Octadecanol | 210 | 8 | 100 | 100.0 | 0.0 | 0.0 | 191 | 68 | 118 | 377 | 87 | 14 | 352 | 453 | 1.26 | 0.086 |
| Comparative Example J8 | $CoCl(Ph_3P)_3$ | Octadecanol | 210 | 20 | 123 | 100.0 | 0.0 | 0.0 | 194 | 73 | 119 | 386 | 90 | 9 | 350 | 449 | 1.32 | 0.110 |

TABLE 11

| | Powder manufacturing conditions | | | | Analysis results of metal magnetic powder | | | | | | | | | | | | | Magnetic characteristics | |
|---|---|---|---|---|---|---|---|---|---|---|---|---|---|---|---|---|---|---|---|
| | | | Reaction temperature | Reaction time | | Ratio of Co crystal phase (%) | | | Content ratio of additive element α (ppm) | | | | Content ratio of additive element β (ppm) | | | | | |
| Sample No. | Precursor | Solvent | ($^\circ$ C.) | (h) | D50 (nm) | hcp-Co | fcc-Co | ε-Co | Fe/Co | Ni/Co | Cu/Co | $W_\alpha/W_{Co}$ | Na/Co | Mg/Co | Ca/Co | $W_\beta/W_{Co}$ | μ' at 5 GHz | tanδ at 5 GHz |
| Comparative Example K1 | $Co_2(CO)_8$ | Ehtanol | 60 | 0.5 | 2 | 98.2 | 1.8 | 0.0 | — | — | — | — | — | — | — | — | 1.15 | 0.172 |
| Comparative Example K2 | $Co_2(CO)_8$ | Ehtanol | 60 | 1 | 7 | 99.1 | 0.9 | 0.0 | — | — | — | — | — | — | — | — | 1.14 | 0.161 |
| Comparative Example K3 | $Co_2(CO)_8$ | Ehtanol | 60 | 3 | 18 | 99.2 | 0.8 | 0.0 | — | — | — | — | — | — | — | — | 1.14 | 0.160 |
| Comparative Example K4 | $Co_2(CO)_8$ | Ehtanol | 60 | 10 | 22 | 98.2 | 1.8 | 0.0 | — | — | — | — | — | — | — | — | 1.15 | 0.154 |
| Comparative Example K5 | $Co_2(CO)_8$ | Ehtanol | 60 | 24 | 78 | 98.1 | 1.9 | 0.0 | — | — | — | — | — | — | — | — | 1.16 | 0.162 |
| Comparative Example K6 | $Co_2(CO)_8$ | Ehtanol | 60 | 72 | 96 | 98.3 | 1.7 | 0.0 | — | — | — | — | — | — | — | — | 1.18 | 0.170 |
| Comparative Example K7 | $Co_2(CO)_8$ | Ehtanol | 60 | 100 | 122 | 98.2 | 1.8 | 0.0 | — | — | — | — | — | — | — | — | 1.23 | 0.238 |
| Example K1 | $Co_2(CO)_8$ | Ehtanol | 60 | 0.5 | 2 | 100.0 | 0.0 | 0.0 | 202 | 59 | 107 | 368 | — | — | — | — | 1.14 | 0.087 |
| Example K2 | $Co_2(CO)_8$ | Ehtanol | 60 | 1 | 8 | 100.0 | 0.0 | 0.0 | 204 | 63 | 110 | 377 | — | — | — | — | 1.14 | 0.086 |
| Example K3 | $Co_2(CO)_8$ | Ehtanol | 60 | 3 | 16 | 100.0 | 0.0 | 0.0 | 199 | 59 | 115 | 373 | — | — | — | — | 1.15 | 0.087 |
| Example K4 | $Co_2(CO)_8$ | Ehtanol | 60 | 10 | 22 | 100.0 | 0.0 | 0.0 | 202 | 62 | 107 | 371 | — | — | — | — | 1.15 | 0.088 |
| Example K5 | $Co_2(CO)_8$ | Ehtanol | 60 | 24 | 78 | 100.0 | 0.0 | 0.0 | 204 | 53 | 117 | 374 | — | — | — | — | 1.16 | 0.092 |
| Example K6 | $Co_2(CO)_8$ | Ehtanol | 60 | 72 | 95 | 100.0 | 0.0 | 0.0 | 204 | 53 | 109 | 366 | — | — | — | — | 1.17 | 0.096 |
| Comparative Example K8 | $Co_2(CO)_8$ | Ehtanol | 60 | 100 | 122 | 100.0 | 0.0 | 0.0 | 200 | 61 | 110 | 371 | — | — | — | — | 1.22 | 0.125 |
| Example K7 | $Co_2(CO)_8$ | Ehtanol | 60 | 0.5 | 2 | 100.0 | 0.0 | 0.0 | 203 | 53 | 116 | 372 | 87 | 11 | 352 | 450 | 1.21 | 0.075 |
| Example K8 | $Co_2(CO)_8$ | Ehtanol | 60 | 1 | 6 | 100.0 | 0.0 | 0.0 | 205 | 54 | 115 | 374 | 85 | 7 | 358 | 450 | 1.20 | 0.074 |
| Example K9 | $Co_2(CO)_8$ | Ehtanol | 60 | 3 | 18 | 100.0 | 0.0 | 0.0 | 197 | 61 | 108 | 366 | 77 | 14 | 353 | 444 | 1.23 | 0.068 |
| Example K10 | $Co_2(CO)_8$ | Ehtanol | 60 | 10 | 22 | 100.0 | 0.0 | 0.0 | 204 | 53 | 111 | 368 | 86 | 11 | 350 | 447 | 1.23 | 0.067 |
| Example K11 | $Co_2(CO)_8$ | Ehtanol | 60 | 24 | 68 | 100.0 | 0.0 | 0.0 | 206 | 53 | 108 | 367 | 78 | 6 | 358 | 442 | 1.24 | 0.072 |
| Example K12 | $Co_2(CO)_8$ | Ehtanol | 60 | 72 | 98 | 100.0 | 0.0 | 0.0 | 199 | 55 | 117 | 371 | 77 | 10 | 356 | 443 | 1.27 | 0.085 |
| Comparative Example K9 | $Co_2(CO)_8$ | Ehtanol | 60 | 100 | 122 | 100.0 | 0.0 | 0.0 | 204 | 60 | 111 | 375 | 81 | 7 | 351 | 439 | 1.35 | 0.109 |

As shown in Table 10 and Table 11, it could be seen that D50 of the metal magnetic powder (nanoparticles) can be controlled by the reaction temperature and the reaction time at the time of pyrolysis. In addition, it could be seen that when D50 of the metal magnetic powder is larger than 100 nm, the magnetic loss increases. Particularly, even in a case of adding the additive element α, when D50 of the metal magnetic powder was larger than 100 nm, the magnetic loss was larger than 0.100. In other words, it could be seen that when the metal magnetic powder having D50 of 10 nm to 100 nm includes the additive element α, the high magnetic permeability and the low magnetic loss are compatible with each other at a high-frequency band.

Note that, from the evaluation results of examples as shown in Table 11, it could be seen that the precursor or the solvent is not particularly limited, and can be arbitrarily selected. In addition, it could be seen that in a condition (Table 10) using $CoCl(Ph_3P)_3$ and octadecanol, ε-Co is likely to be generated as a sub-phase. On the other hand, it could be seen that in a condition (Table 11) using $Co_2(CO)_8$ and ethanol, fcc-Co is likely to be generated as a sub-phase. In addition, it could be seen that when the additive element α exists, generation of ε-Co and fcc-CO is suppressed, and the degree of crystallization of hcp-Co is improved.

Experiment 5

In Experiment 5, after manufacturing metal magnetic powders under the same conditions as in Example C7 in Experiment 1, composite magnetic bodies according to Example C7a to Example C7e were manufactured by changing a blending ratio of the metal magnetic powders. In addition, after manufacturing metal magnetic powders under the same conditions as in Example F11 in Experiment 2, composite magnetic bodies according to Example F11a to Example File were manufactured by changing a blending ratio of the metal magnetic powders. Furthermore, in Experiment 5, after manufacturing metal magnetic powders under the same conditions as in Comparative Example A in Experiment 1, composite magnetic bodies according to Comparative Example Aa to Comparative Example Ae were manufactured by changing a blending ratio of the metal magnetic powders. Manufacturing conditions other than the blending ratio of the metal magnetic powders were set to be similar as in Experiment 1.

In Experiment 5, a cross-section of each of the manufactured composite magnetic bodies was observed with a TEM to measure an area ratio of the metal magnetic powder (nanoparticles) included in the composite magnetic body. As a result thereof, in the respective examples and comparative examples, it could be confirmed that the area ratio of the nanoparticles appropriately match a target value (vol %) shown in Table 11. In addition, spot analysis, line analysis, and mapping analysis by EDS were performed at the time of TEM observation. As a result thereof, it could be confirmed that in all examples in Experiment 5, the metal magnetic powder in the composite magnetic bodies includes the additive element α and the additive element β as intended. That is, characteristic X-ray of the additive element α and a characteristic X-ray of the additive element β were detected at the inside and/or on the surface of any analysis particle among analysis particles set as an analysis target.

Typically, when increasing the content ratio (packing density) of the magnetic powder in the composite magnetic body, the magnetic permeability increases, but the magnetic loss characteristics tend to decrease (that, the magnetic loss increases). In Experiment 5, the determination criteria of the magnetic characteristic are set for every content ratio of the nanoparticles in consideration of a variation of the magnetic characteristics due to an increase and a decrease in the packing density. Specifically, in experiment 5, a sample satisfying the following requirements is determined as being "satisfactory".

Content ratio (10 vol %) of nanoparticles: $1.10 \le \mu'$, tan $\delta \le 0.150$ Content ratio (20 vol %) of nanoparticles: $1.20 \le \mu'$, tan $\delta \le 0.180$ Content ratio (30 vol %) of nanoparticles: $1.40 \le \mu'$, tan $\delta \le 0.210$ Content ratio (40 vol %) of nanoparticles: $1.60 \le \mu'$, tan $\delta \le 0.250$ Content ratio (50 vol %) of nanoparticles: $1.80 \le \mu'$, tan $\delta \le 0.300$ Content ratio (60 vol %) of nanoparticles: $2.00 \le \mu'$, tan $\delta \le 0.350$ Evaluation results in Experiment 5 are shown in Table 12.

TABLE 12

| Sample No. | D50 (nm) | Analysis results of metal magnetic powder: Ratio of Co crystal phase (%) hcp-Co | fcc-Co | ε-Co | Content ratio of additive element α (ppm) Fe/Co | Ni/Co | Cu/Co | $W_\alpha/W_{Co}$ | Content ratio of additive element β (ppm) Na/Co | Mg/Co | Ca/Co | $W_\beta/W_{Co}$ | Composite magnetic body Content ratio of nano-particles (vol %) | Magnetic characteristics μ' at 5 GHz | tanδ at 5 GHz |
|---|---|---|---|---|---|---|---|---|---|---|---|---|---|---|---|
| Comparative Example A | 16 | 98.2 | 0.0 | 1.8 | — | — | — | — | — | — | — | — | 10 | 1.15 | 0.156 |
| Comparative Example Aa | 16 | 98.2 | 0.0 | 1.8 | — | — | — | — | — | — | — | — | 20 | 1.32 | 0.202 |
| Comparative Example Ab | 16 | 98.2 | 0.0 | 1.8 | — | — | — | — | — | — | — | — | 30 | 1.52 | 0.267 |
| Comparative Example Ac | 16 | 98.2 | 0.0 | 1.8 | — | — | — | — | — | — | — | — | 40 | 1.75 | 0.355 |
| Comparative Example Ad | 16 | 98.2 | 0.0 | 1.8 | — | — | — | — | — | — | — | — | 50 | 2.00 | 0.458 |
| Comparative Example Ae | 16 | 98.2 | 0.0 | 1.8 | — | — | — | — | — | — | — | — | 60 | 2.27 | 0.588 |
| Example C7 | 17 | 100.0 | 0.0 | 0.0 | 212 | 61 | 112 | 385 | — | — | — | — | 10 | 1.15 | 0.083 |
| Example C7a | 17 | 100.0 | 0.0 | 0.0 | 212 | 61 | 112 | 385 | — | — | — | — | 20 | 1.32 | 0.113 |
| Example C7b | 17 | 100.0 | 0.0 | 0.0 | 212 | 61 | 112 | 385 | — | — | — | — | 30 | 1.51 | 0.149 |
| Example C7c | 17 | 100.0 | 0.0 | 0.0 | 212 | 61 | 112 | 385 | — | — | — | — | 40 | 1.74 | 0.198 |
| Example C7d | 17 | 100.0 | 0.0 | 0.0 | 212 | 61 | 112 | 385 | — | — | — | — | 50 | 2.01 | 0.255 |
| Example C7e | 17 | 100.0 | 0.0 | 0.0 | 212 | 61 | 112 | 385 | — | — | — | — | 60 | 2.28 | 0.328 |
| Example F11 | 13 | 100.0 | 0.0 | 0.0 | 195 | 62 | 115 | 372 | 86 | 11 | 353 | 450 | 10 | 1.20 | 0.070 |
| Example F11a | 13 | 100.0 | 0.0 | 0.0 | 195 | 62 | 115 | 372 | 86 | 11 | 353 | 450 | 20 | 1.47 | 0.095 |
| Example F11b | 13 | 100.0 | 0.0 | 0.0 | 195 | 62 | 115 | 372 | 86 | 11 | 353 | 450 | 30 | 1.80 | 0.131 |
| Example F11c | 13 | 100.0 | 0.0 | 0.0 | 195 | 62 | 115 | 372 | 86 | 11 | 353 | 450 | 40 | 2.20 | 0.169 |
| Example F11d | 13 | 100.0 | 0.0 | 0.0 | 195 | 62 | 115 | 372 | 86 | 11 | 353 | 450 | 50 | 2.66 | 0.219 |
| Example F11e | 13 | 100.0 | 0.0 | 0.0 | 195 | 62 | 115 | 372 | 86 | 11 | 353 | 450 | 60 | 3.17 | 0.289 |

As shown in Table 12, in Examples (C7a to C7e, and F11a to F11e) in which the content ratio of the nanoparticles exceeds 10 vol %, as in Example C7 and Example F11, the high magnetic permeability could also be obtained while suppressing an increase in the magnetic loss at a high-frequency band. Particularly, in Examples F11a to Example F11e including both the additive element α and additive element β, an increase in the magnetic loss due to an increase in the packing density could be more effectively suppressed, and higher magnetic permeability could be obtained in comparison to Example C7a to Example C7e.

In addition, from the results in Experiment 5, it could be seen that the content ratio of the nanoparticles is preferably 40 vol % or less from the viewpoint of further reducing the magnetic loss.

EXPLANATIONS OF LETTERS OR NUMERALS

1 METAL MAGNETIC POWDER
2 NANOPARTICLE
3α CRYSTAL PHASE (INCLUDING ADDITIVE ELEMENT α)
3β PHASE (INCLUDING ADDITIVE ELEMENT β)
31,32 PARTICLE
10 COMPOSITE MAGNETIC BODY
6 RESIN
100 INDUCTOR
50 COIL PORTION
50*a*, 50*b* LEADOUT PORTION
60, 80 EXTERNAL ELECTRODE

What is claimed is:

1. A metal magnetic powder, comprising:

metal nanoparticles having an average particle size (D50) is 1 nm to 100 nm, and a main phase of hexagonal close packing Co; and an additive element α including at least one of Fe, Ni, and Cu, wherein a weight ratio of the total content of the additive element α to the content of Co is 10 ppm to 2000 ppm, and Co occupies 80 wt % or more in the metal magnetic powder.

2. The metal magnetic powder according to claim 1, further comprising:

an additive element β including at least one of Na, Mg, and Ca.

3. The metal magnetic powder according to claim 2, wherein a weight ratio of the total content of the additive element β to the content of Co is 10 ppm to 1500 ppm.

4. An electronic component, comprising:

the metal magnetic powder according to claim 1.

5. A composite magnetic body, comprising:

metal nanoparticles having an average particle size (D50) is 1 nm to 100 nm, and a main phase of hexagonal close packing Co;

a resin; and an additive element α including at least one of Fe, Ni, and Cu, wherein a weight ratio of the total content of the additive element α to the content of Co is 10 ppm to 2000 ppm, and Co occupies 80 wt % or more in the metal magnetic powder.

6. The composite magnetic body according to claim 5, further comprising:

an additive element β including at least one of Na, Mg, and Ca.

7. An electronic component, comprising:

the composite magnetic body according to claim 5.

* * * * *